(12) United States Patent
Matsushita et al.

(10) Patent No.: US 8,406,242 B2
(45) Date of Patent: Mar. 26, 2013

(54) COMMUNICATION SYSTEM, TERMINAL DEVICE, AND COMMUNICATION METHOD FOR PERFORMING COMMUNICATION BASED ON THE REAL-TIME TRANSPORT PROTOCOL/RTP CONTROL PROTOCOL

(75) Inventors: Takashi Matsushita, Ichinomiya (JP); Makoto Nishida, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 269 days.

(21) Appl. No.: 12/886,166

(22) Filed: Sep. 20, 2010

(65) Prior Publication Data
US 2011/0075668 A1    Mar. 31, 2011

(30) Foreign Application Priority Data
Sep. 25, 2009    (JP) ................. 2009-221104

(51) Int. Cl.
*H04L 12/56* (2006.01)
(52) U.S. Cl. ........................................ 370/401
(58) Field of Classification Search .................. None
See application file for complete search history.

(56) References Cited

U.S. PATENT DOCUMENTS

| | | | |
|---|---|---|---|
| 7,623,513 B2 | 11/2009 | Gobara et al. | |
| 7,933,263 B1* | 4/2011 | Huang | 370/356 |
| 2002/0141390 A1 | 10/2002 | Fangman et al. | |
| 2002/0152325 A1 | 10/2002 | Elgebaly et al. | |
| 2004/0213152 A1* | 10/2004 | Matuoka et al. | 370/230 |
| 2008/0037440 A1* | 2/2008 | Politowicz | 370/253 |
| 2008/0172708 A1* | 7/2008 | Perry et al. | 725/110 |
| 2009/0323703 A1* | 12/2009 | Bragagnini et al. | 370/401 |
| 2010/0023646 A1 | 1/2010 | Gobara et al. | |
| 2010/0205313 A1* | 8/2010 | Boire-Lavigne et al. | 709/228 |
| 2011/0066713 A1* | 3/2011 | Kudo | 709/223 |

FOREIGN PATENT DOCUMENTS

| | | |
|---|---|---|
| JP | A-2006-136030 | 5/2006 |
| JP | A-2006-136031 | 5/2006 |

OTHER PUBLICATIONS

Audet et al., "Network Address Translation (NAT) Behavioral Requirements for Unicast UDP," *IETF Standard*, Internet Engineering Task Force, Chapter 4, Jan. 1, 2007.
European Search Report issued in Application No. 10 25 1634; Dated Dec. 22, 2010.
European Search Report issued in Application No. 10251634.1; Dated Dec. 30, 2010.

* cited by examiner

*Primary Examiner* — Timothy J Weidner
(74) *Attorney, Agent, or Firm* — Oliff & Berridge, PLC

(57) ABSTRACT

A communication system for performing communication based on the Real-time Transport Protocol/RTP Control Protocol (RTP/RTCP) comprises a communication control device, a first NAT device and a second NAT device, a caller terminal device, and a callee terminal device. The caller terminal device transmits a first packet to the communication control device, receives a second packet that contains a second port number that is stored in the second NAT device, determines whether the second port number is one of an odd number and an even number; and transmits, in a case where it has been determined that the second port number is an odd number, an RTP packet to a port number that is computed by adding 2n−1 to the second port number, then transmits an RTCP packet to a port number that is computed by adding 2n to the second port number.

7 Claims, 14 Drawing Sheets

US 8,406,242 B2

COMMUNICATION SYSTEM, TERMINAL DEVICE, AND COMMUNICATION METHOD FOR PERFORMING COMMUNICATION BASED ON THE REAL-TIME TRANSPORT PROTOCOL/RTP CONTROL PROTOCOL

CROSS-REFERENCE TO RELATED APPLICATION

This application claims priority to Japanese Patent Application No. 2009-221104, filed Sep. 25, 2009, the disclosure of which is hereby incorporated by reference in its entirety.

BACKGROUND

The present invention relates to a communication system, a terminal device, and a communication method that perform communication based on the Real-time Transport Protocol/RTP Control Protocol (RTP/RTCP).

The terminal device, in order to establish a session with another terminal device that is subordinate to a device (a NAT router or the like, hereinafter called a NAT device) that is provided with a network address translation (NAT) function, must detect a port number that is stored in the NAT device and transmit a packet to that port number.

A known method for establishing a session between terminal devices that are subordinate to different NAT devices is described. In this method, a terminal device that is connected to a local area network (LAN) transmits a bubble packet to a communication terminal that is connected to the Internet. The port number for the LAN-connected terminal device to perform communication with the Internet-connected communication terminal is stored in the NAT device. The stored port number is transmitted through a server to a terminal device that is subordinate to a different NAT device. The terminal device that has received the port number transmits the packet using the received port number as a destination port number. The session between the terminal devices that are subordinate to the different NAT devices is thus established.

SUMMARY

In order to perform RTP/RTCP-based communication between terminal devices that are subordinate to different NAT devices, the destination port number in a RTP packet must be an even number. In addition, the destination port number in a RTCP packet must be an odd number that is computed by adding 1 to the destination port number in the RTP packet. However, in the method that is described in the aforementioned Japanese Laid-Open Patent Publication, the port numbers that are stored in the NAT device are not necessarily consecutive even and odd numbers. Cases therefore may occur in which the terminal device cannot assign consecutive even and odd numbers as the respective destination port numbers for the RTP packet and the RTCP packet. Thus, the terminal device may not be able to perform the RTP/RTCP-based communication.

Various exemplary embodiments of the general principles herein provide a communication system, a terminal device, and a communication method that are capable of performing RTP/RTCP-based communication between terminal devices that are subordinate to different NAT devices.

Exemplary embodiments provide a communication system for performing communication based on the Real-time Transport Protocol/RTP Control Protocol (RTP/RTCP) comprises a communication control device that is connected to an external network, a first NAT device and a second NAT device that are each connected to the external network and provided with a NAT function, a caller terminal device that is connected to an internal network that is subordinate to the first NAT device, and a callee terminal device that is connected to another internal network that is subordinate to the second NAT device. The caller terminal device includes a first transmission unit, a first receiving unit, a first determination unit, and a second transmission unit. The first transmission unit transmits a first packet through the first NAT device to the communication control device. The first NAT device stores as history information a port number that permits forwarding, adding 1 to the port number that has been stored as the history information every time that the first NAT device receives a packet that is directed toward an external network side from a subordinate internal network side, and stores as the history information a first port number that is thus computed. The first receiving unit receives from the communication control device a second packet that contains the first port number and a second port number. The second port number is stored in the second NAT device in a case where the second NAT device received a third packet that was transmitted by the callee terminal device. The first determination unit determines whether the second port number that is contained in the second packet that was received by the first receiving unit is one of an odd number and an even number. The second transmission unit transmits, in a case where it has been determined that the second port number is an odd number, an RTP packet to a port number that is computed by adding 2n−1 (n being an integer that is not less than 1) to the second port number, then transmits an RTCP packet to a port number that is computed by adding 2n to the second port number, and transmits in a case where it has been determined that the second port number is an even number, the RTP packet to a port number that is computed by adding 2n to the second port number, then transmits the RTCP packet to a port number that is computed by adding 2n+1 to the second port number. The callee terminal device includes a second receiving unit, and a third transmission unit. The second receiving unit receives the first packet transmitted from the communication control device. The third transmission unit transmits the third packet through the second NAT device to the communication control device. The second NAT device stores as history information a port number that permits forwarding, adding 1 to the port number that has been stored as the history information every time that the second NAT device receives a packet that is directed toward the external network side from a subordinate internal network side, and stores as the history information the second port number that is thus computed. The communication control device includes a third receiving unit, a fourth transmission unit, a fourth receiving unit, and a fifth transmission unit. The third receiving unit receives the first packet that is transmitted from the caller terminal device. The fourth transmission unit transmits the received first packet to the callee terminal device. The fourth receiving unit receives the third packet that is transmitted from the callee terminal device. The fifth transmission unit transmits the second packet containing the first port number and the second port number to the caller terminal device.

Exemplary embodiments also provide a terminal device for performing communication based on the Real-time Transport Protocol/RTP Control Protocol (RTP/RTCP), that is connected to an internal network that is subordinate to a NAT device that is connected to an external network and provided with a NAT function comprises a first transmission unit, a first receiving unit, a first determination unit, and a second transmission unit. The first transmission unit transmits a first packet through the NAT device to a communication control device connected to the external network, the NAT device storing as history information a port number that permits forwarding, adding 1 to the port number that has been stored as the history information every time that the NAT device receives a packet that is directed toward an external network side from a subordinate internal network side, and storing as the history information a first port number that is thus computed. The first receiving unit receives from the communication control device a second packet that contains the first port number and a second port number, the second port number being stored in another NAT device in a case where the other NAT device receives a third packet from another terminal device, the other NAT device being connected to the external network and provided with the NAT function, the other terminal device being connected to another internal network that is subordinate to the other NAT device and being adapted to transmit the third packet to the communication control device when the other terminal device receives the first packet transmitted from the communication control device. The first determination unit determines whether the second port number that is contained in the second packet that was received by the first receiving unit is one of an odd number and an even number. The second transmission unit transmits, in a case where it has been determined that the second port number is an odd number, an RTP packet to a port number that is computed by adding 2n−1 (n being an integer that is not less than 1) to the second port number, then transmits an RTCP packet to a port number that is computed by adding 2n to the second port number, and transmits, in a case where it has been determined that the second port number is an even number, the RTP packet to a port number that is computed by adding 2n to the second port number, then transmits the RTCP packet to a port number that is computed by adding 2n+1 to the second port number.

Exemplary embodiments further provide a communication method for performing communication based on the Real-time Transport Protocol/RTP Control Protocol (RTP/RTCP) between terminal devices that are respectively connected to different internal networks that are subordinate to different NAT devices that are each connected to an external network and provided with a NAT function. The communication method comprises the step of transmitting a first packet, from a terminal device, through a NAT device to a communication control device connected to the external network, the NAT device storing as history information a port number that permits forwarding, adding 1 to the port number that has been stored as the history information every time that the NAT device receives a packet that is directed toward an external network side from a subordinate internal network side, and storing as the history information a first port number that is thus computed. The communication method further comprises the step of transmitting a third packet, from another terminal device when the other terminal device receives the first packet transmitted from the communication control device, through another NAT device to the communication control device, the other terminal device being connected to the internal network that is subordinate to the other NAT device, the other NAT device storing as history information a port number that permits forwarding, adding 1 to the port number that has been stored as the history information every time that the NAT device receives a packet that is directed toward the external network side from the subordinate internal network side, and storing as the history information a second port number that is thus computed. The communication method further comprises the step of transmitting second packets, from the communication control device to the terminal device, the second packet containing the first port number and the second port number that are respectively stored as the history information in the NAT device that forwarded the first packet and in the other NAT device that forwarded the second packet. The communication method further comprises the step of receiving, by the terminal device, the second packet that was transmitted from the communication control device. The communication method further comprises the step of determining, by the terminal device, whether the second port number contained in the received second packet is one of an odd number and an even number. The communication method further comprises the step of transmitting, from the terminal device, in a case where it has been determined that the second port number is an odd number, an RTP packet to a port number that is computed by adding 2n−1 (n being an integer that is not less than 1) to the second port number, then transmitting an RTCP packet to a port number that is computed by adding 2n to the second port number, and transmitting, from the terminal device, in a case where it has been determined that the second port number is an even number, the RTP packet to a port number that is computed by adding 2n to the second port number, then transmitting the RTCP packet to a port number that is computed by adding 2n+1 to the second port number.

BRIEF DESCRIPTION OF THE DRAWINGS

Exemplary embodiments will be described below in detail with reference to the accompanying drawings in which.

DETAILED DESCRIPTION

Figure 1:
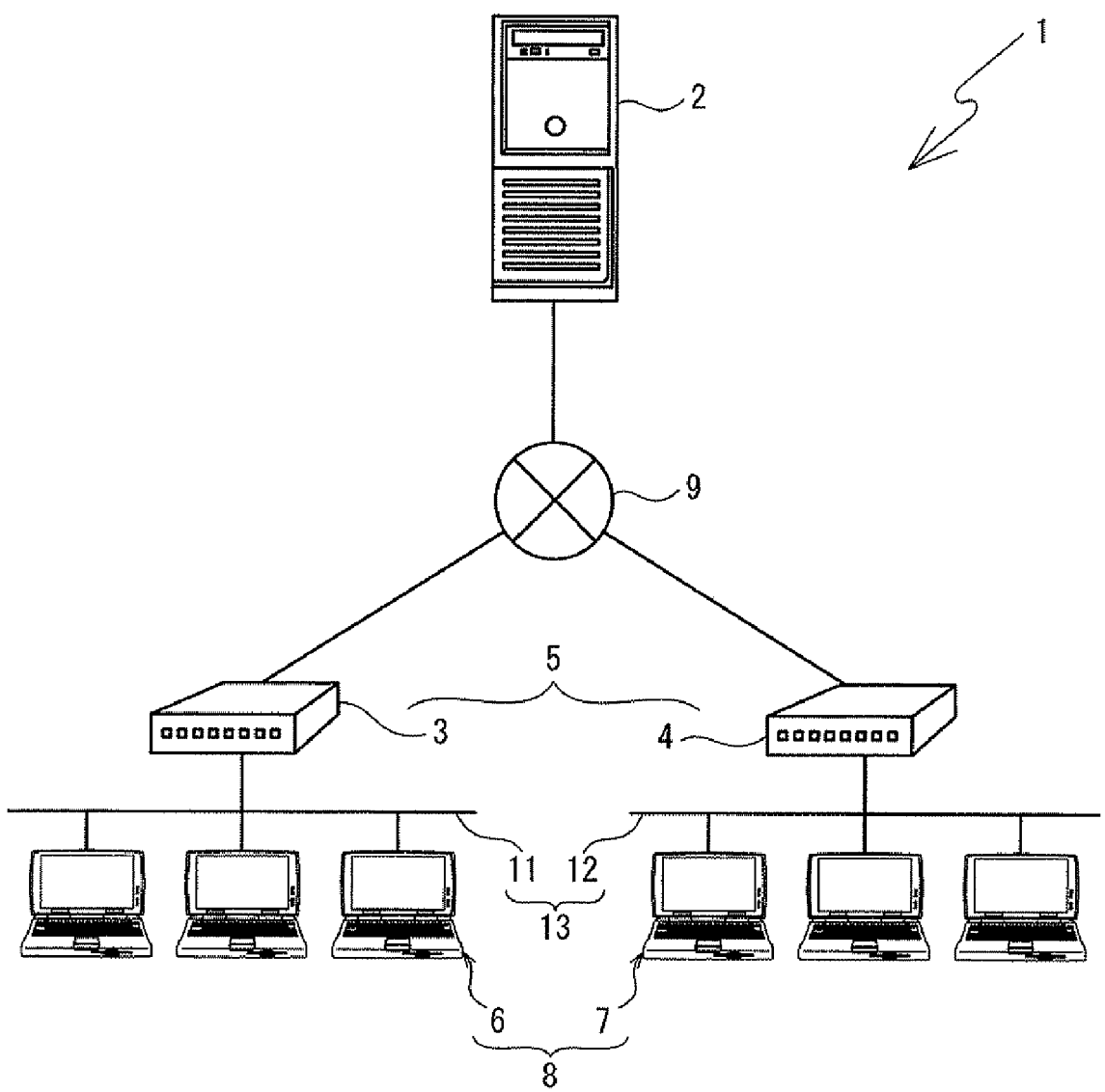
FIG. 1 is a schematic diagram that shows a communication system 1.

As shown in FIG. 1, a communication system 1 includes a communication control device 2, terminal devices 6, terminal devices 7, and NAT devices 3 and 4. The communication control device 2 and the NAT devices 3 and 4 are connected to an Internet 9. The terminal devices 6 are connected to a LAN 11 that is subordinate to the NAT device 3. The terminal devices 7 are connected to a LAN 12 that is subordinate to the NAT device 4. Hereinafter, in a case where the terminal devices 6 and 7 are referenced collectively and in a case where no distinction is made between the terminal devices 6 and 7, they are called the terminal devices 8. In a case where the NAT devices 3 and 4 are referenced collectively and in a case where no distinction is made between the NAT devices 3 and 4, they are called the NAT devices 5. In a case where the LANs 11 and 12 are referenced collectively and in a case where no distinction is made between the LANs 11 and 12, they are called the LANs 13.

The communication control device 2 provides to the terminal devices 6 and 7 information that is necessary in order to enable communication between the terminal devices 6 and the terminal devices 7. A call control server or a Simple Traversal of UDP through NATs (STUN) server, for example, can be used as the communication control device 2. Based on the information that is provided by the communication control device 2, the terminal devices 8 perform communication with the other terminal devices 8 that are subordinate to the other one of the NAT devices 5. Personal computers (PCs), for example, can be used as the terminal devices 8.

The NAT devices 5 are provided with a NAT function. In a case where one of the NAT devices 5 receives from one of the terminal devices 8 a packet that is going from the LAN 13 side to the Internet 9 side, the NAT device 5 converts a source IP address and a source port number for the packet. The converted port number is stored as history information in the NAT device 5. The stored port number is used in a case where a packet is received that is going from the Internet 9 side to the LAN 13 side. Based on the stored port number, a determination is made as to whether or not the packet will be forwarded from the Internet 9 side to the LAN 13 side. In a case where the port number that is stored as the history information is the same as a destination port number for the packet that has been received from the Internet 9 side, the received packet is forwarded to the LAN 13 side. In a case where the port number that is stored as the history information is not the same as the destination port number for the packet that has been received from the Internet 9 side, the received packet is not forwarded to the LAN 13 side. Thus the NAT device 5 makes it impossible for an unspecified party to access the LAN 13 side. In the present embodiment, in a case where the NAT device 5 converts the port numbers of the packets sequentially, every time the port number is converted, 1 is added to the port number that is stored as the history information. The port numbers that are output are assigned to the packets.

A NAT device for which a NAT type is one of Cone NAT and Symmetric NAT can be used as the NAT device 5.

In the present embodiment, RTP/RTCP-based communication is performed between the terminal devices 8 that are connected to the LANs 13 that are subordinate to the different NAT devices 5. For example, the RTP/RTCP-based communication is performed between one of the terminal devices 6 that are connected to the LAN 11 that is subordinate to the NAT device 3 and one of the terminal devices 7 that are connected to the LAN 12 that is subordinate to the NAT device 4.

RTP is a data transport protocol for distributing a data stream of sound, images, and the like in real time. RTCP is a protocol that controls a session for the transmitting and receiving of data based on RTP. In order for the transmitting and receiving of data to be performed using RTP/RTCP, two conditions must be fulfilled. The first condition is that the destination port number of the RTP packet must be an even number. The second condition is that the destination port number of the RTCP packet must be an odd number that is computed by adding 1 to the destination port number of the RTP packet.

The present invention can use any of various types of known networks (a LAN, a wide area network (WAN), a dedicated circuit, and the like) other than the Internet 9 as an external network. The present invention can use a known network (the Internet, a WAN, a dedicated circuit, or the like) other than the LAN 13 as an internal network.

Figure 2:
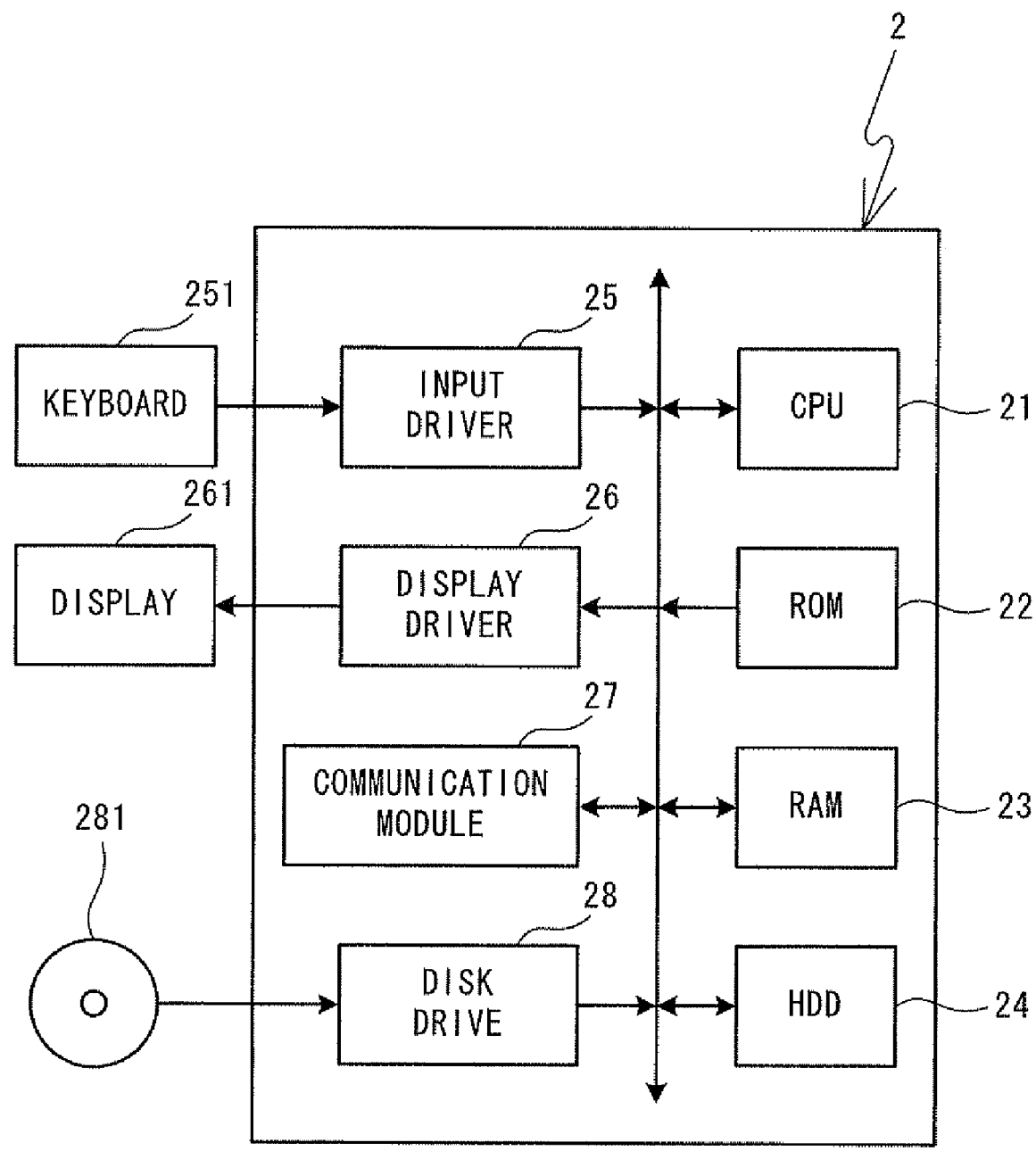
FIG. 2 is a block diagram that shows an electrical configuration of a communication control device 2.

As shown in FIG. 2, the communication control device 2 is provided with a CPU 21, a ROM 22, a RAM 23, and an HDD 24. The CPU 21 controls communication with the NAT devices 5 and the terminal devices 8. At least a boot program and an initially set parameter are stored in the ROM 22. At least temporary data that the CPU 21 generates during processing are stored in the RAM 23. At least a program for the CPU 21 is stored in the HDD 24. The CPU 21 is electrically connected to the ROM 22, the RAM 23, and the HDD 24. The CPU 21 can access storage areas in the ROM 22, the RAM 23, and the HDD 24.

The communication control device 2 is provided with an input driver 25. The input driver 25 detects information that is input through a keyboard 251. The CPU 21 is electrically connected to the input driver 25. The input driver 25 is electrically connected to the keyboard 251. The CPU 21 can recognize the information that is input through the keyboard 251. The communication control device 2 is provided with a display driver 26. The display driver 26 performs control for displaying an image on a display 261. The CPU 21 is electrically connected to the display driver 26. The display driver 26 is electrically connected to the display 261. The CPU 21 can display a desired image on the display 261.

The communication control device 2 is provided with a communication module 27. The communication module 27 mediates communication through the Internet 9. The CPU 21 is electrically connected to the communication module 27. The CPU 21 can perform communication through the Internet 9. The communication control device 2 is provided with a disk drive 28. The disk drive 28 is a drive device that accesses information that is stored in a storage medium 281. The CPU 21 is electrically connected to the disk drive 28. The CPU 21 can access the information that is stored in the storage medium 281 that is inserted into the disk drive 28. A program that the CPU 21 executes, for example, is stored in the storage medium 281. When the communication control device 2 connects to the communication system 1, the program is read from the storage medium 281 and is stored in the HDD 24.

Figure 3:
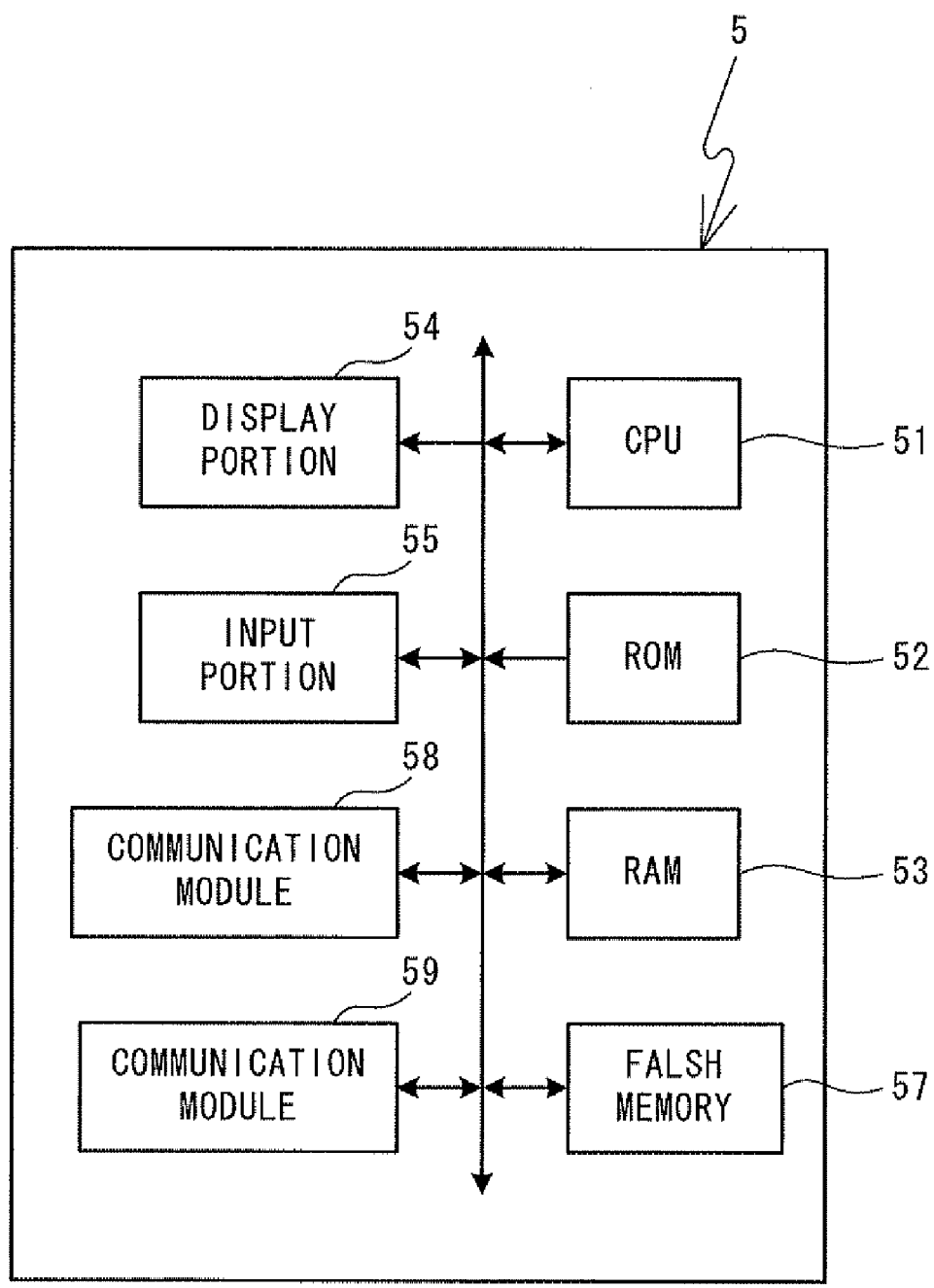
FIG. 3 is a block diagram that shows an electrical configuration of a NAT device 5.

As shown in FIG. 3, each of the NAT devices 5 is provided with a CPU 51, a ROM 52, a RAM 53, and a flash memory 57. The CPU 51 controls the communication with the communication control device 2 and the terminal devices 8. At least a program for the CPU 51 is stored in the ROM 52. At least temporary data that the CPU 51 generates during processing are stored in the RAM 53. The port numbers are stored as the history information in the flash memory 57. The CPU 51 is electrically connected to the ROM 52, the RAM 53, and the flash memory 57. The CPU 51 can access storage areas in the ROM 52, the RAM 53, and the flash memory 57.

Each of the NAT devices 5 is provided with a display portion 54. The display portion 54 can display a status and the like of the NAT device 5. The CPU 51 is electrically connected to the display portion 54. The CPU 51 can display desired information on the display portion 54. An LED, for example, can be used as the display portion 54. Each of the NAT devices 5 is provided with an input portion 55. The input portion 55 accepts an input operation to the NAT device 5 by a user. The CPU 51 is electrically connected to the input portion 55. The CPU 51 can recognize information that is input through the input portion 55. A switch or a touch sensor, for example, can be used as the input portion 55.

Each of the NAT devices 5 is provided with a communication module 58. The communication module 58 mediates communication through the Internet 9. The CPU 51 is electrically connected to the communication module 58. The CPU 51 can perform communication through the Internet 9. Each of the NAT devices 5 is provided with a communication module 59. The communication module 59 mediates communication through the LAN 13. CPU 51 is electrically connected to the communication module 59. The CPU 51 can perform communication through the LAN 13.

Figure 4:
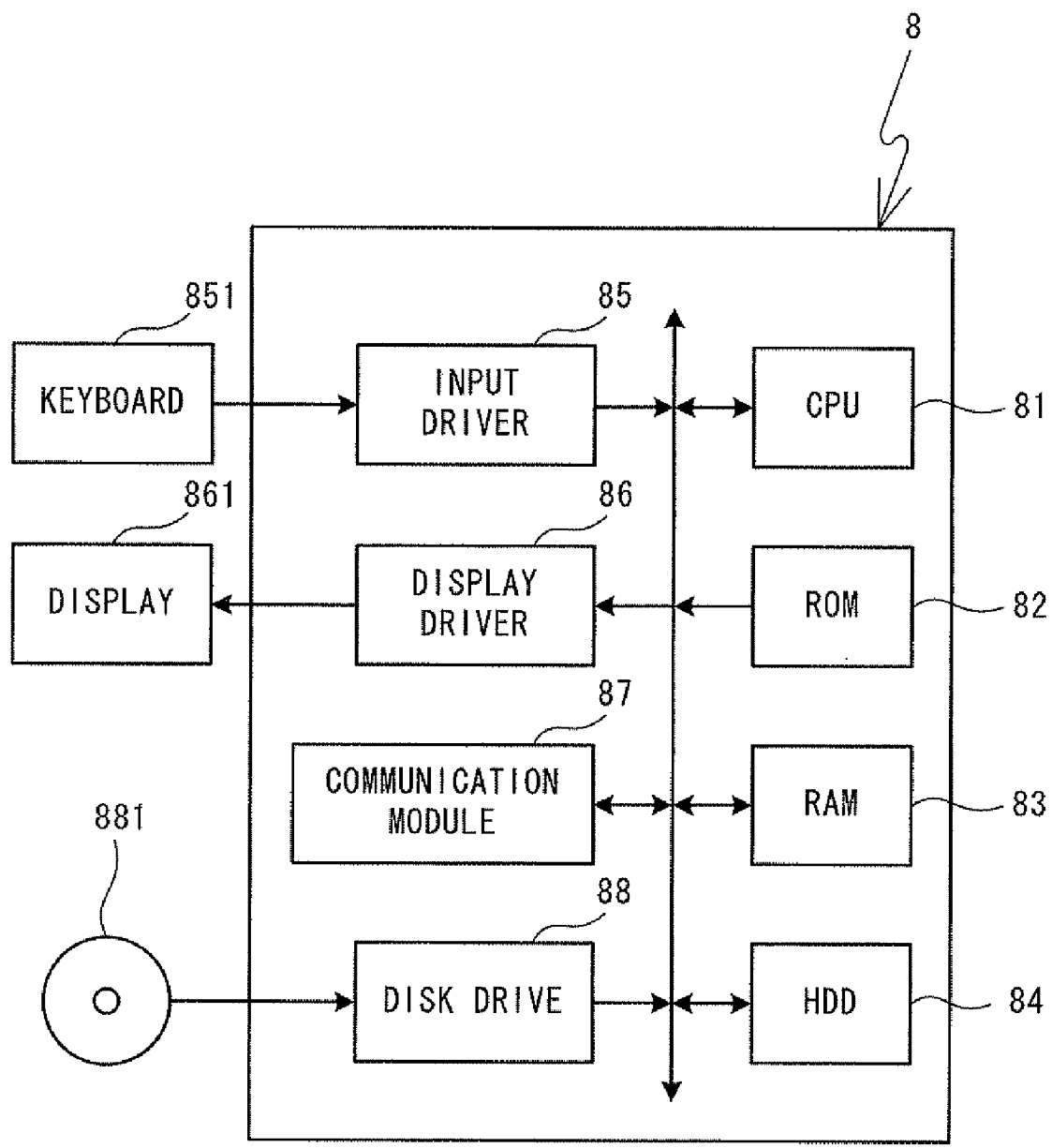
FIG. 4 is a block diagram that shows an electrical configuration of a terminal device 8.

As shown in FIG. 4, each of the terminal devices 8 is provided with a CPU 81, a ROM 82, a RAM 83, and an HDD 84. The CPU 81 controls communication with the NAT device 5 and the communication control device 2. At least a boot program and an initial parameter are stored in the ROM 82. At least temporary data that the CPU 81 generates during processing are stored in the RAM 83. At least a program for the CPU 81 is stored in the HDD 84. The CPU 81 is electrically connected to the ROM 82, the RAM 83, and the HDD 84. The CPU 81 can access storage areas in the ROM 82, the RAM 83, and the HDD 84.

Each of the terminal devices 8 is provided with an input driver 85. The input driver 85 detects information that is input through a keyboard 851. The CPU 81 is electrically connected to the input driver 85. The input driver 85 is electrically connected to the keyboard 851. The CPU 81 can recognize the information that is input through the keyboard 851. Each of the terminal devices 8 is provided with a display driver 86. The display driver 86 performs control for displaying an image on a display 861. The CPU 81 is electrically connected to the display driver 86. The display driver 86 is electrically connected to the display 861. The CPU 81 can display a desired image on the display 861.

Each of the terminal devices 8 is provided with a communication module 87. The communication module 87 mediates communication through the LAN 13. The CPU 81 is electrically connected to the communication module 87. The CPU 81 can perform communication through the LAN 13. Each of the terminal devices 8 is provided with a disk drive 88. The disk drive 88 is a drive device that accesses information that is stored in a storage medium 881. The CPU 81 is electrically connected to the disk drive 88. The CPU 81 can access the information that is stored in the storage medium 881 that is inserted into the disk drive 88. A program that the CPU 81 executes, for example, is stored in the storage medium 881. When the terminal device 8 connects to the communication system 1, the program is read from the storage medium 881 and is stored in the HDD 84.

Terminal processing will be explained with reference to FIGS. 5 to 9. The terminal processing is started and performed by the CPU 81 when the power supply to the terminal device 8 is turned on. The terminal device 8 recognizes the IP address of the communication control device 2 before the terminal processing is started. The port number for performing the communication between the terminal device 8 and the communication control device 2 has already been stored as the history information in the NAT device 5 that is directly connected to the terminal device 8. The communication control device 2 recognizes the port number that has been stored as the history information in the NAT device 5. The communication control device 2 recognizes the NAT type of the NAT device 5 (one of Full Cone NAT, Address-Restricted Cone NAT, Port-Restricted Cone NAT, and Symmetric NAT). The communication control device 2 recognizes a port width that will be added to the port number that is stored as the history information in a case where the NAT device 5 will convert the port numbers of the packets. In the explanation of the terminal processing, an explanation of the communication processing that is necessary in order to start the communication between the terminal device 8 and the communication control device 2 will be omitted.

Figure 5:
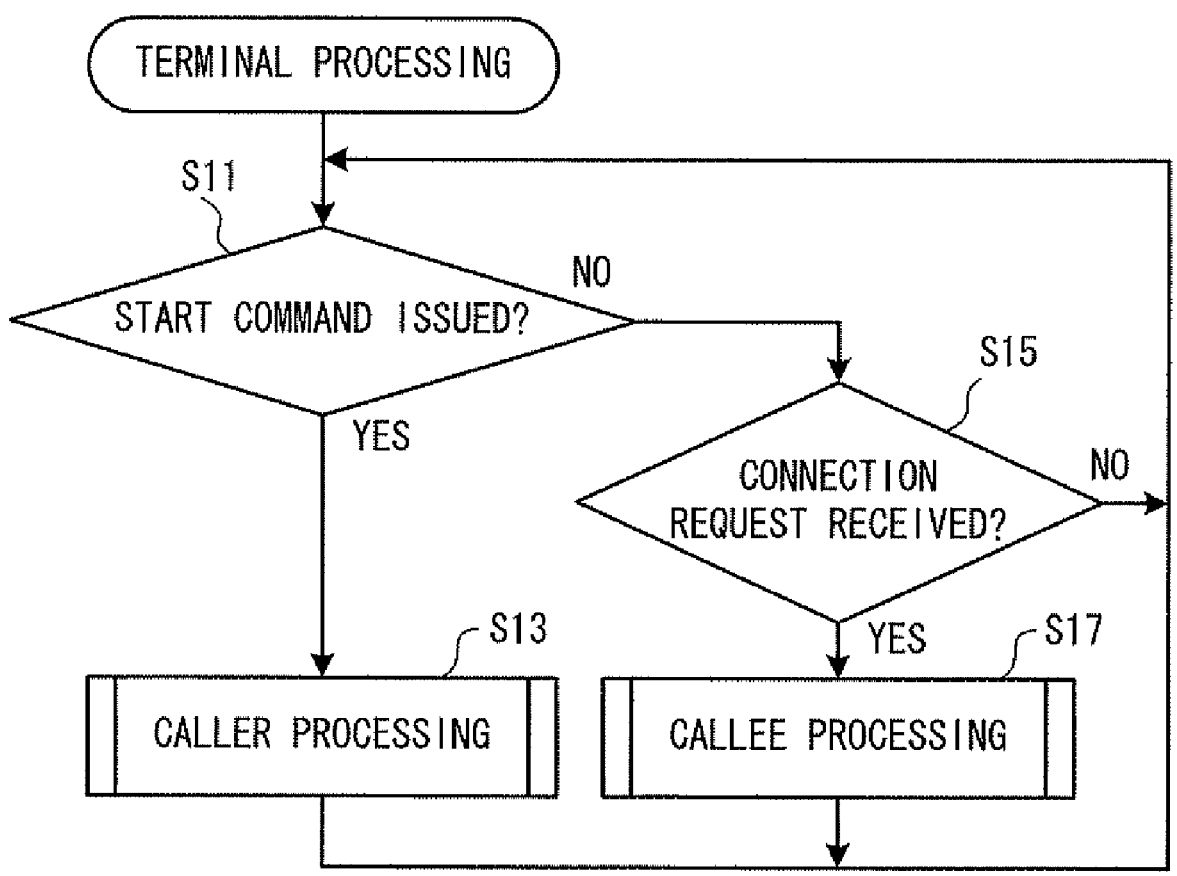
FIG. 5 is a flowchart that shows terminal processing.

In FIG. 5, when the terminal processing is started, a determination is made as to whether an operation to start communication with another terminal device 8 has been performed through the keyboard 851 (Step S11). In a case where the keyboard 851 has been operated by the user to start communication with the other of the terminal device 8 (YES at Step S11), caller processing (refer to FIGS. 6 and 7) is performed in order to operate the terminal device 8 as a caller terminal device 8 (hereinafter called a caller terminal) (Step S13). After the caller processing is completed, the processing returns to Step S11.

In a case where the keyboard 851 has not been operated (NO at Step S11), a determination is made as to whether a connection request packet (described later) that is transmitted from a caller terminal has been received (Step S15). In a case where the connection request packet from the caller terminal has been received (YES at Step S15), NAT information that is contained in the connection request packet is acquired. Callee processing (refer to FIGS. 8 and 9) is performed in order to operate the terminal device 8 as a callee terminal device 8 (hereinafter called a callee terminal) (Step S17). After the callee processing is completed, the processing returns to Step S11. In a case where the connection request packet from the caller terminal has not been received (NO at Step S15), the processing returns to Step S11.

Hereinafter, the caller terminal will be explained as corresponding to one of the terminal devices 6 in FIG. 1 and the callee terminal will be explained as corresponding to one of the terminal devices 7 in FIG. 1. In other words, a case will be explained in which the caller processing is performed by the terminal device 6 and the callee processing is performed by the terminal device 7.

Figure 6:
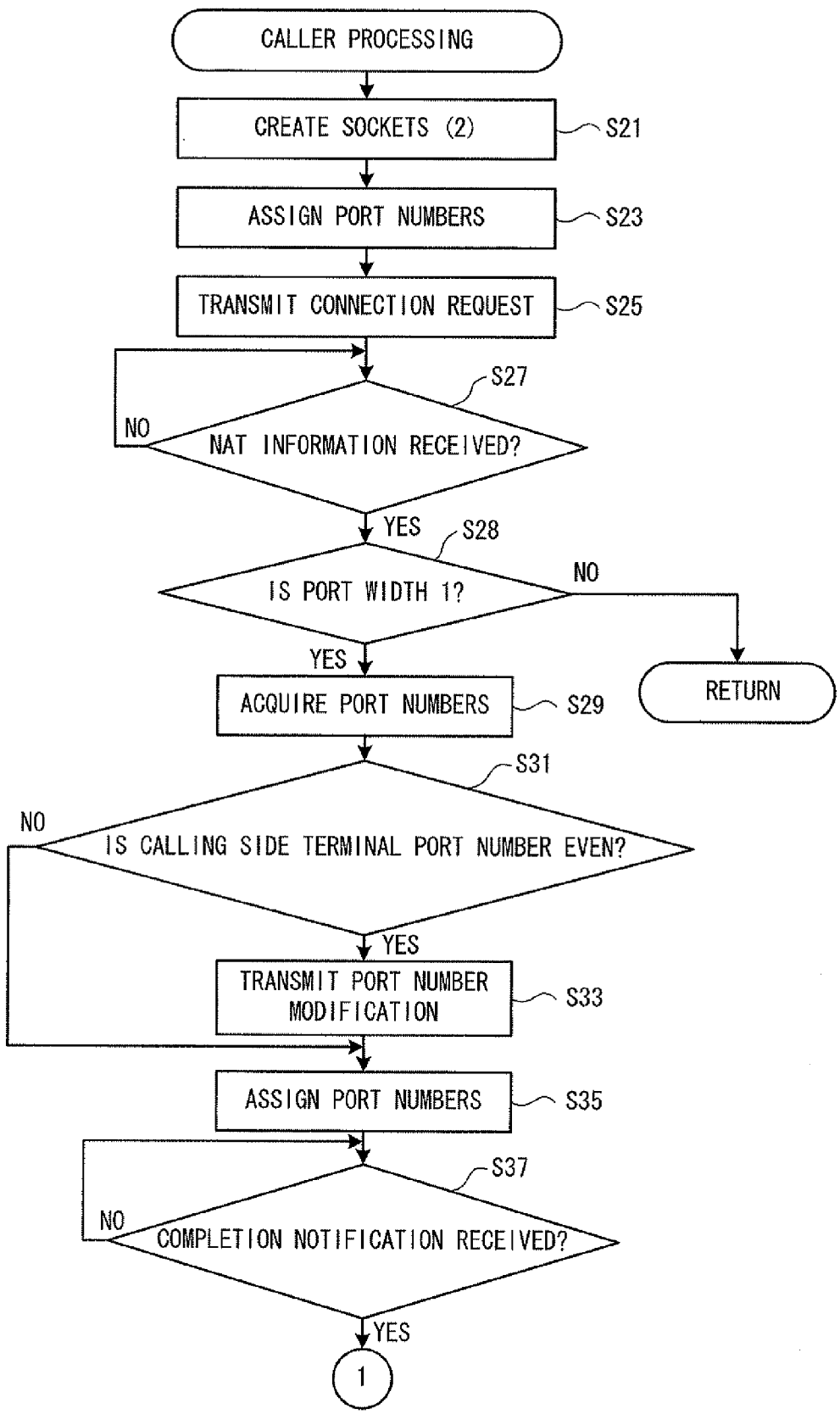
FIG. 6 is a flowchart that shows caller processing.

In the caller processing in FIG. 6, sockets are created in order to perform communication using the port number (Step S21). One port number is assigned to one socket. At Step S21, a total of two sockets are created, one for communication with the communication control device 2 and one for communication of a port number modification packet (described later in detail). In the explanation that follows, the socket for the communication with the communication control device 2 is called a first socket. The socket for transmitting the port number modification packet is called a second socket. The port numbers are assigned to the created sockets (Step S23). An even port number is assigned to the first socket. An odd port number that is computed by adding 1 to the port number that has been assigned to the first socket is assigned to the second socket.

In the present embodiment, the port numbers are assigned by the rules described above for the first socket and the second socket, but the port numbers may also be assigned randomly.

The first socket is used to transmit the connection request packet from the terminal device 6 to the communication control device 2 to request that the communication with the terminal device 7 be started (Step S25). The transmitted connection request packet passes through the NAT device 3 and arrives at the communication control device 2. When the NAT device 3 forwards the connection request packet, the NAT device 3 converts the source port number for the connection request packet. The converted source port number is stored as the port number history information in the flash memory 57 of the NAT device 3.

The communication control device 2 receives the connection request packet. The communication control device 2 takes the source IP address and the source port number for the received connection request packet and appends them to the connection request packet. The communication control device 2 also appends the NAT type and the port width to the connection request packet. The information that is appended to the connection request packet corresponds to the NAT information for the NAT device 3. The connection request packet to which the NAT information has been appended is forwarded to the terminal device 7 (Step S107; refer to FIG. 10). The communication control device 2 receives (Step S109; refer to FIG. 10) a connection reply packet that is transmitted from the terminal device 7 (Step S65; refer to FIG. 8). From the connection request packet that has been received from the terminal device 6 and from the connection reply packet that has been received from the terminal device 7, the communication control device 2 acquires the port numbers that are stored as the history information in the NAT devices 3 and 4, as well as the IP addresses of the NAT devices 3 and 4 (Steps S111, S113; refer to FIG. 10). The acquired information and the NAT types and the port widths for the NAT devices 3 and 4 are stored in a NAT information packet. The NAT information packet is transmitted from the communication control device 2 to the terminal device 6 (Step S117; refer to FIG. 10).

The CPU 81 determines whether or not the NAT information packet that is transmitted from the communication control device 2 has been received through the NAT device 3 (Step S27). In a case where the NAT information packet has not been received (NO at Step S27), the processing returns to Step S27. In a case where the NAT information packet has been received (YES at Step S27), the caller processing determines whether or not the port widths for the NAT devices 3 and 4 that are included in the NAT information are both 1 (Step S28). In a case where at least one of the port widths is not 1 (NO at Step S28), the terminal device 6 cannot perform the RTP/RTCP-based communication with the terminal device 7. The processing therefore returns to the terminal processing (refer to FIG. 5). In a case where the port widths are both 1 (YES at Step S28), the processing advances to Step S29.

The port numbers that are stored in the NAT devices 3 and 4 are acquired from the information that is contained in the NAT information packet (Step S29). A determination is made as to whether the newest port number in the history information that is stored in the NAT device 3, which is directly connected to the terminal device 6, is an even number (Step S31). In a case where the port number is an even number (YES at Step S31), the port number modification packet is transmitted to the communication control device 2 using the second socket, in order to cause an odd-numbered port number to be stored in the history information of the NAT device 3 (Step S33). The port number modification packet is transmitted from the terminal device 6 such that the newest port number that is stored as the history information in the NAT device 3 will be updated and an odd-numbered port number will be stored. The processing then advances to Step S35. The NAT device 3 receives the port number modification packet. The source port number in the received port number modification packet is different from the port number in the previously received connection request packet. The NAT device 3 adds the port width of 1 to the stored newest port number and assigns the resulting port number to the port number modification packet. The NAT device 3 adds the assigned port number to the history information. The port number modification packet is forwarded by the NAT device 3 and arrives at the communication control device 2. In a case where the acquired port number is an odd number (NO at Step S31), the processing advances to Step S35.

The second socket that was created at Step S21 for transmitting the port number modification packet is closed. A socket for communication with the terminal device 7 that is based on the RTP protocol and a socket for communication with the terminal device 7 that is based on the RTCP protocol are newly created. In the explanation that follows, the socket for the communication with the terminal device 7 that is based on the RTP protocol is called a third socket. The socket for the communication with the terminal device 7 that is based on the RTCP protocol is called a fourth socket. Port numbers are assigned to the third socket and the fourth socket that have been created (Step S35). The port numbers that are assigned are consecutive values that start with an even number.

In the present embodiment, the port numbers are assigned by the rules described above for the third socket and the fourth socket, but the port numbers may also be assigned randomly. However, in a case where the NAT device stores the source port number in the received packet as the history information without altering it, the consecutive even and odd port numbers are assigned as described above. This makes it possible to store the consecutive even and odd port numbers as the history information in the NAT device.

The CPU 81 determines whether or not a completion notification packet that is transmitted from the terminal device 7 (Step S85; refer to FIG. 9) has been received (Step S37). In a case where the completion notification packet has not been received (NO at Step S37), the processing returns to Step S37. In a case where the completion notification packet has been received (YES at Step S37), the processing advances to Step S39 (refer to FIG. 7).

Figure 7:
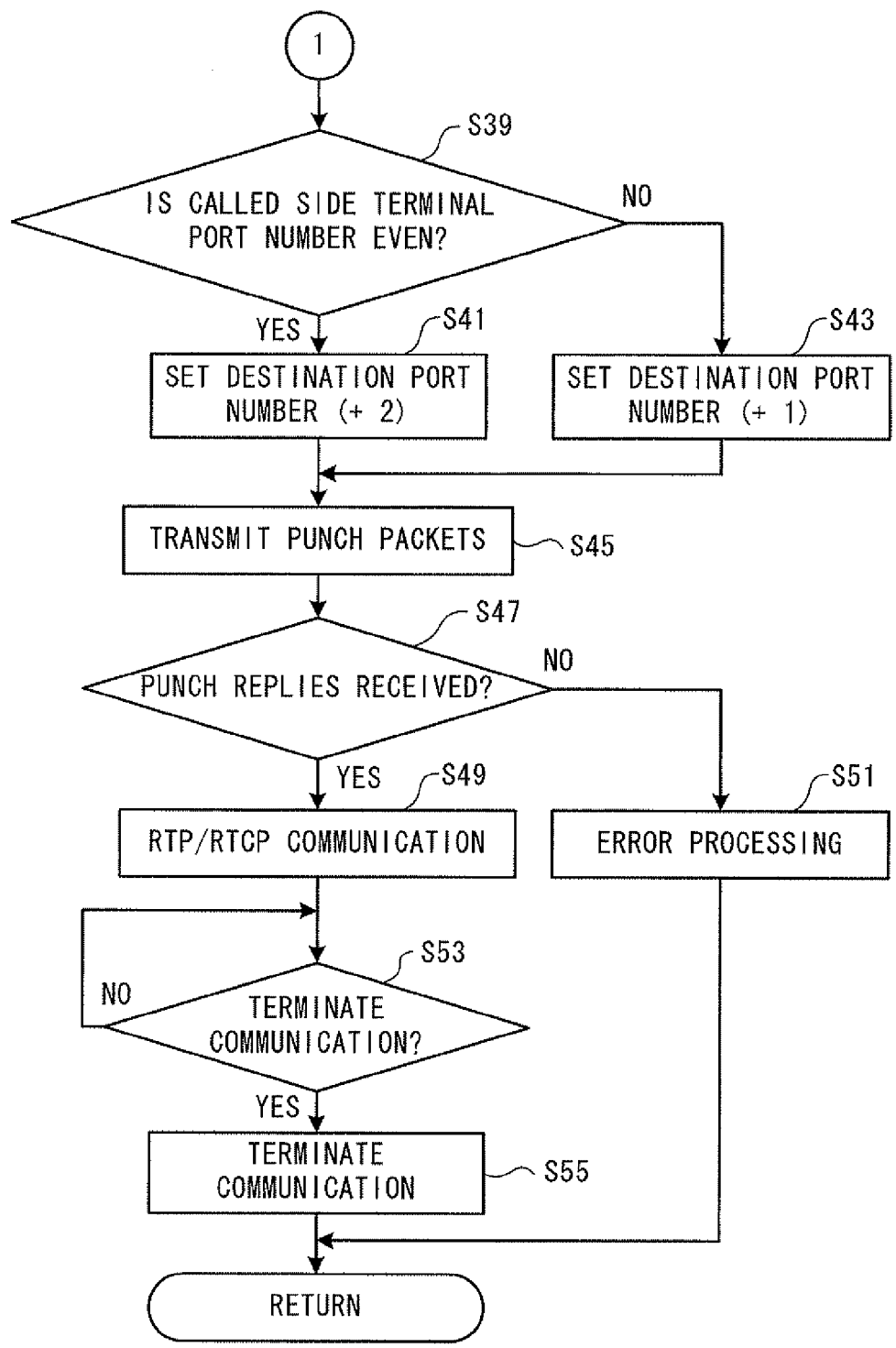
FIG. 7 is a flowchart that shows the caller processing, continued from FIG. 6.

In the processing at Steps S39 to S43 in FIG. 7, the destination port numbers that will be used when the RTP packet and the RTCP packet are transmitted are specified based on the newest port number that is stored in the NAT device 4, which is directly connected to the terminal device 7. The destination port number for the RTP packet is made an even number. The destination port number for the RTCP packet is made an odd number that is computed by adding 1 to the destination port number for the RTP packet. The processing that is described below is then performed.

A determination is made as to whether or not the newest port number in the history information that is stored in the NAT device 4 is an even number (Step S39). In a case where the newest port number is an even number (YES at Step S39), a value that is computed by adding 2 to the newest port numbers specified as the destination port number for the RTP packet (Step S41). The destination port number for the RTCP packet is specified to a value that is computed by adding 1 to the destination port number for the RTP packet. The processing then advances to Step S45. In a case where the newest port number in the history information that is stored in the NAT device 4 is an odd number (NO at Step S39), a value that is computed by adding 1 to the newest port number is specified as the destination port number for the RTP packet (Step S43). The destination port number for the RTCP packet is specified to a value that is computed by adding 1 to the destination port number for the RTP packet. The processing then advances to Step S45.

In the preceding explanation, 2 is added to the newest port number in the history information that is stored in the NAT device 4 in a case where the newest port number is an even number, and 1 is added in a case where the newest port number is an odd number. The present invention is not limited to using this method. Any method may be used as long as the destination port numbers for the RTP packet and the RTCP packet are consecutive even and odd numbers, respectively. For example, in a case where the newest port number in the history information that is stored in the NAT device 4 is an even number, a value that is computed by adding 2n (where n is an integer that is not less than 1) to the newest port number may be specified as the destination port number for the RTP packet. A value that is computed by adding 2n+1 to the newest port number may be specified as the destination port number for the RTCP packet. In the same manner, in a case where the newest port number that is stored in the NAT device 4 is an odd number, a value that is computed by adding 2n−1 to the newest port number may be specified as the destination port number for the RTP packet. A value that is computed by adding 2n to the newest port number may be specified as the destination port number for the RTCP packet.

In the processing at Step S45, the port numbers are stored as the history information in the NAT device 3, such that the RTP packet and the RTCP packet that are transmitted from the terminal device 7 can be received through the NAT device 3. The third socket and the fourth socket that were created at Step S35 (refer to FIG. 6) are used. The third socket is used to transmit a first punch packet to the terminal device 7. The destination port number for the first punch packet is the port number for the RTP packet that was specified by the processing at Steps S39 to S43. The fourth socket is used to transmit a second punch packet to the terminal device 7. The destination port number for the second punch packet is the port number for the RTCP packet that was specified by the processing at Steps S39 to S43 (Step S45).

The first and second punch packets are transmitted to the terminal device 7 by way of the NAT device 3. The first and second punch packets are transmitted from different port numbers. Therefore, the NAT device 3 updates the stored port numbers and assigns the updated port numbers to the two punch packets. The assigned port numbers are stored as the history information in the flash memory 57 of the NAT device 3. In the terminal device 7, these port numbers are specified as the destination port numbers for the RTP packet and the RTCP packet (which will be described later).

After the punch packets are transmitted, a determination is made as to whether punch reply packets that are transmitted from the terminal device 7 have been received (Step S47). In a case where the punch reply packets have been received (YES at Step S47), a state is established in which the communication of the RTP packet and the RTCP packet is enabled. As will be described later, the same sort of processing is also performed in the terminal device 7, and a state is established in which the communication of the RTP packet and the RTCP packet is enabled. Thereafter, the RTP/RTCP-based communication between the terminal device 6 and the terminal device 7 is performed (Step S49). The destination port numbers for the RTP packet and the RTCP packet are set to the port numbers that are specified in Steps S41 and S43.

In a state in which the user has not performed a communication termination operation through the keyboard 851 (NO at Step S53), the RTP/RTCP-based communication continues to be performed. In a case where the user has performed the communication termination operation through the keyboard 851 (YES at Step S53), the RTP/RTCP-based communication is terminated (Step S55). The caller processing is terminated, and the processing returns to the terminal processing (refer to FIG. 5).

In a case where the punch reply packets have not been received, even after a specified period of the time has elapsed since the punch packets were transmitted (NO at Step S47), a communication error occurs. In that case, the RTP/RTCP-based communication with the terminal device 7 cannot continue to be performed, so an error notification is displayed on the display 861 in order to notify the user that the communication error has occurred. Error processing that is necessary in order to terminate the communication is performed (Step S51). The caller processing is terminated, and the processing returns to the terminal processing (refer to FIG. 5).

Figure 8:
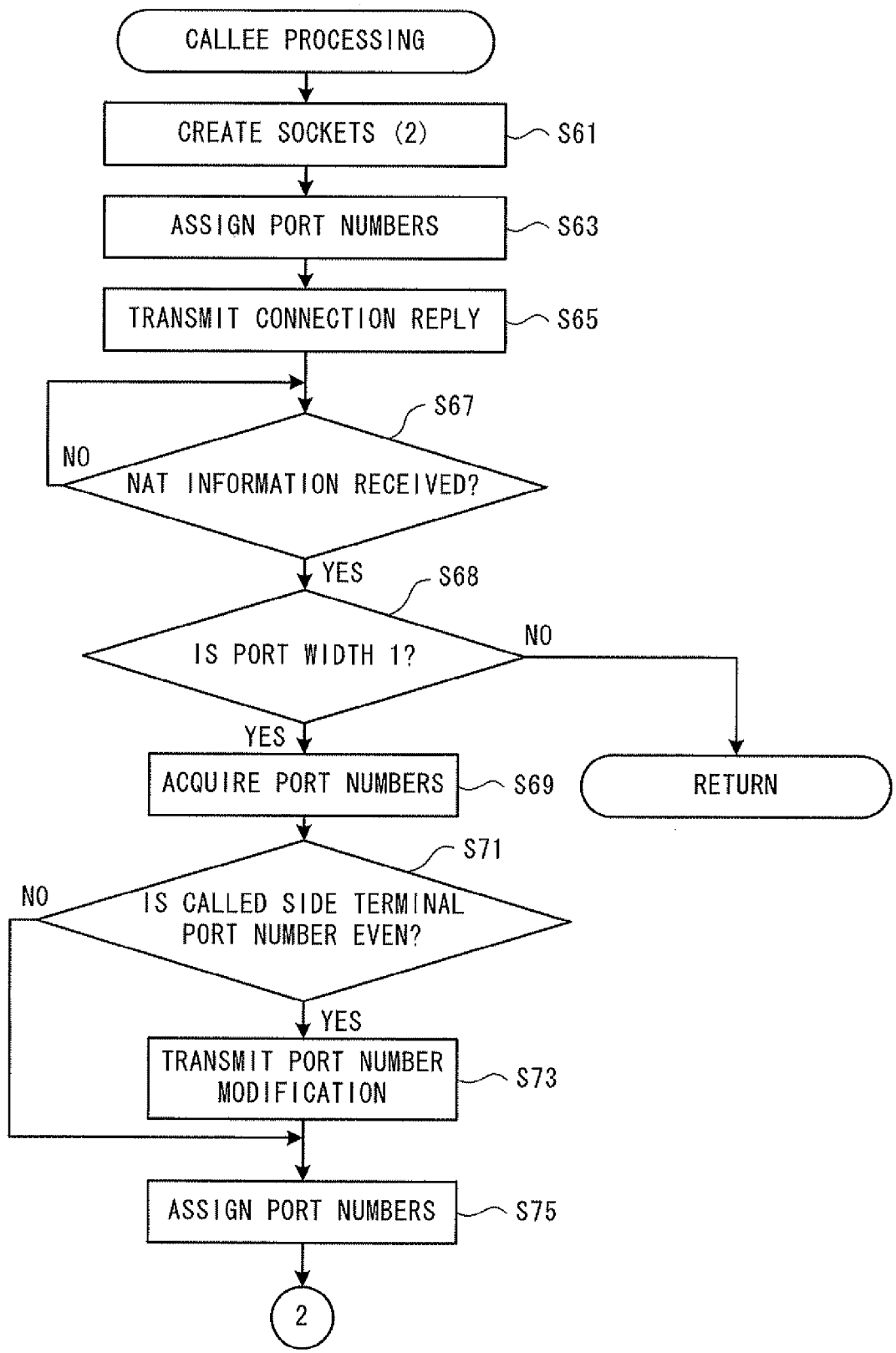
FIG. 8 is a flowchart that shows callee processing.
Figure 9:
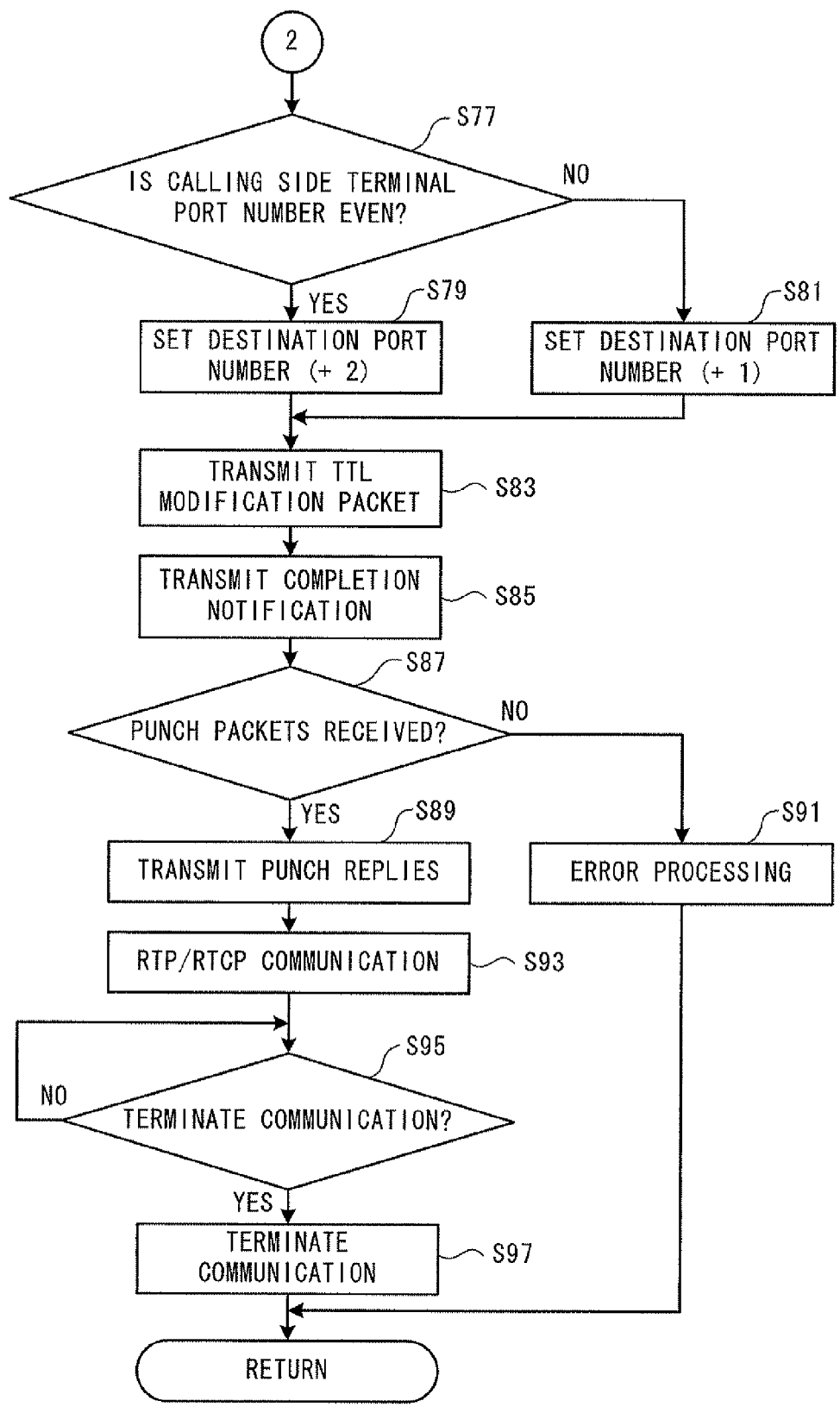
FIG. 9 is a flowchart that shows the callee processing, continued from FIG. 8.

In the callee processing in FIGS. 8 and 9, two sockets are created (Step S61). A first socket is used as the socket for communication with the communication control device 2. A second socket is used as the socket for the communication of the port number modification packet. Port numbers are assigned to the created sockets (Step S63).

The connection reply packet that provides notification that the connection request packet has been received is transmitted to the communication control device 2 using the first socket (Step S65). The transmitted connection reply packet passes through the NAT device 4 and arrives at the communication control device 2. When forwarding the connection reply packet, the NAT device 4 converts the source port number for the connection reply packet. The converted source port number is stored in the flash memory 57 of the NAT device 4 as the history information on the port numbers for which forwarding can be performed.

Figure 10:
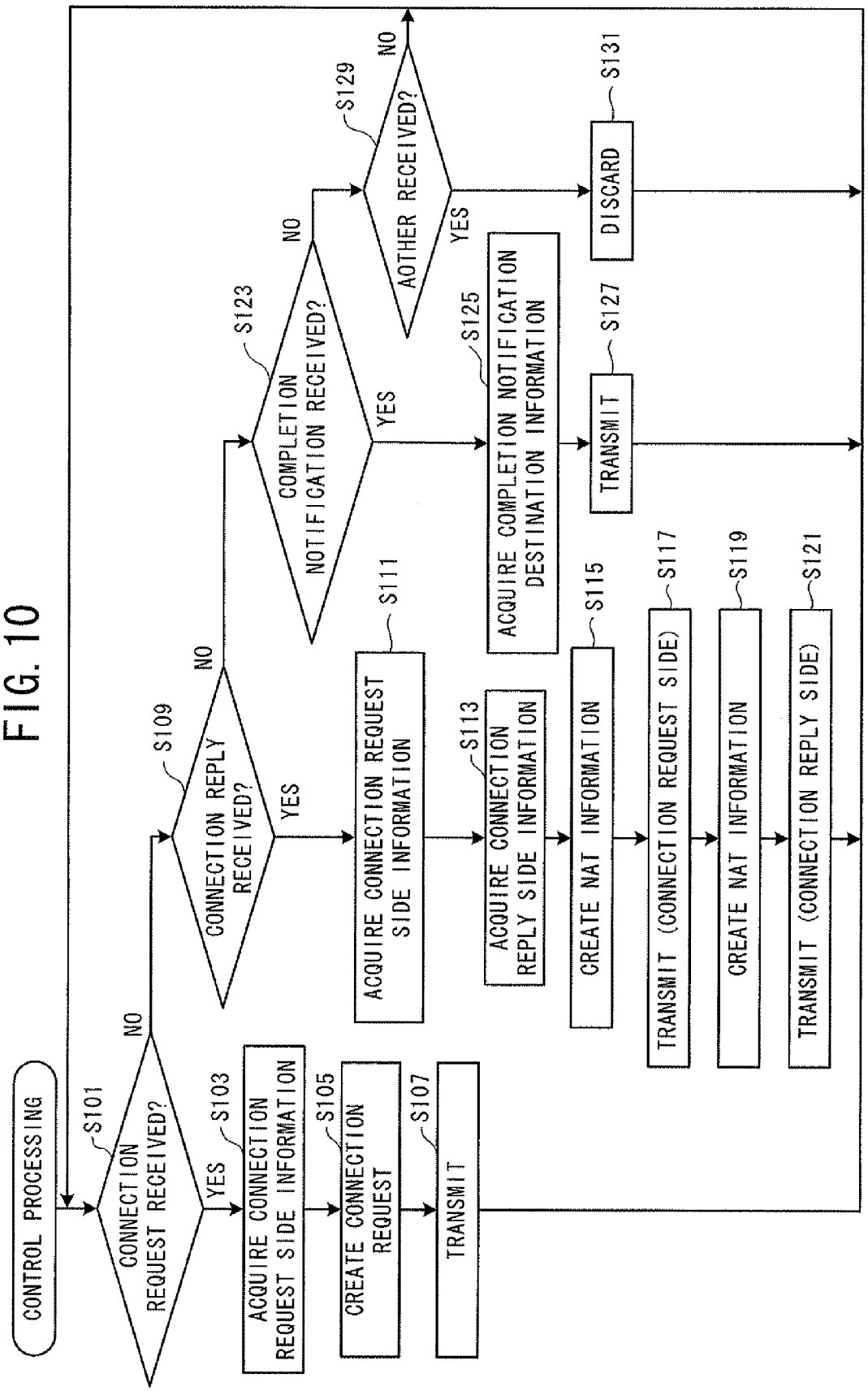
FIG. 10 is a flowchart that shows control processing.

The communication control device 2 receives the connection reply packet (Step S109; refer to FIG. 10). The communication control device 2 transmits the NAT information to the terminal device 7 (Step S121; refer to FIG. 10).

In the terminal device 7, a determination is made as to whether the NAT information packet that was transmitted from the communication control device 2 has been received (Step S67). In a case where the NAT information packet has not been received (NO at Step S67), the processing returns to Step S67. In a case where the NAT information packet has been received (YES at Step S67), the CPU81 determines whether or not the port widths for the NAT devices 3 and 4 that are included in the NAT information that was received along with the connection request packet at Step S15 (refer to FIG. 5) and in the newly received NAT information are all 1 (Step S68). In a case where at least one of the port widths is not 1 (NO at Step S68), the processing returns to the terminal processing (refer to FIG. 5). In a case where all of the port widths are 1 (YES at Step S68), the processing advances to Step S69.

The newest port numbers that are stored in the NAT devices 3 and 4 are acquired (Step S69). A determination is made as to whether the newest port number in the history information that is stored in the NAT device 4, which is directly connected to the terminal device 7, is an even number (Step S71). In a case where the port number is an even number (YES at Step S71), the port number modification packet is transmitted to the communication control device 2 using the second socket (Step S73). The processing then advances to Step S75. In a case where the acquired port number is an odd number (NO at Step S71), the processing advances to Step S75. At Step S75, a third socket and a fourth socket are newly created. Port numbers are assigned to the third socket and the fourth socket that have been created (Step S75). The processing advances to Step S77 (refer to FIG. 9).

In the processing at Steps S77 to S81 in FIG. 9, the destination port numbers that will be used when the RTP packet and the RTCP packet are transmitted are specified based on the newest port number that is stored as the history information in the NAT device 3, which is directly connected to the terminal device 6. A determination is made as to whether or not the newest port number is an even number (Step S77). In a case where the newest port number is an even number (YES at Step S77), a value that is computed by adding 2 to the newest port number is specified as the destination port number for the RTP packet (Step S79). The destination port number for the RTCP packet is specified to a value that is computed by adding 1 to the destination port number for the RTP packet. The processing then advances to Step S83. In a case where the newest port number is an odd number (NO at Step S77), a value that is computed by adding 1 to the newest port number is specified as the destination port number for the RTP packet (Step S81). The destination port number for the RTCP packet is specified to a value that is computed by adding 1 to the destination port number for the RTP packet. The processing then advances to Step S83.

The present invention is not limited to using the computation method that is described above. For example, in a case where the newest port number in the history information that is stored in the NAT device 3 is an even number, a value that is computed by adding 2n (where n is an integer that is not less than 1) to the newest port number may be specified as the destination port number for the RTP packet. In a case where the newest port number is an odd number, 2n−1 may be added to the newest port number.

At Step S83, the port numbers are stored as the history information in the NAT device 4, such that the RTP packet and the RTCP packet that are transmitted from the terminal device 6 can be received through the NAT device 4. Packets (TTL modification packets) are used that have low values for a Time To Live (TTL) that is equivalent to the number of routers through which the TTL modification packet is able to pass. The value of the TTL is modified such that the TTL modification packets will pass through the NAT device 4 and will not arrive at the NAT device 3. The TTL becomes zero before the TTL modification packets arrive at the NAT device 3, and the TTL modification packets are discarded. It is therefore possible to prevent the TTL modification packets from corrupting the history information in the NAT device 3 and from enabling a filtering function of the NAT device 3.

The third socket is used to transmit a first TTL modification packet to the terminal device 6. The destination port number for the first TTL modification packet is the port number for the RTP packet that was specified by the processing at Steps S77 to S81. The fourth socket is used to transmit a second TTL modification packet to the terminal device 6. The destination port number for the second TTL modification packet is the port number for the RTCP packet that was specified by the processing at Steps S77 to S81 (Step S83).

The first and second TTL modification packets are transmitted to the terminal device 6 by way of the NAT device 4. When forwarding the two TTL modification packets, the NAT device 4 stores both of the converted port numbers as the history information in the flash memory 57. In the terminal device 6, these port numbers are specified as the destination port numbers for the RTP packet and the RTCP packet (Steps S41, S43; refer to FIG. 7).

After the TTL modification packets are transmitted, the completion notification packet is transmitted to the terminal device 6 in order to notify the terminal device 6 that the RTP/RTCP-based communication has been enabled (Step S85). After the completion notification packet has been transmitted, a determination is made as to whether the punch packets that were transmitted from the terminal device 6 have been received (Step S87). The punch packets are transmitted to the port numbers that were stored in the NAT device 4 by the TTL modification packets. The punch packets pass through the NAT device 4 and arrive at the terminal device 7. In a case where the punch packets have been received (YES at Step S87), the punch reply packets are transmitted to the terminal device 6 (Step S89).

After the punch reply packets have been transmitted, the terminal device 7 is in a state in which it is able to receive the RTP packet and the RTCP packet that are transmitted from the terminal device 6. The same sort of processing is also performed in the terminal device 6, such that the terminal device 6 is in a state in which it is able to receive the RTP packet and the RTCP packet that are transmitted from the terminal device 7. The RTP/RTCP-based communication is then performed between the terminal device 6 and the terminal device 7 (Step S93). A determination is made as to whether the communication termination operation has been performed through the keyboard 851 (Step S95). In a case where the communication termination operation has not been performed (NO at step S95), the processing returns to Step S95. In a case where the communication termination operation has been performed (YES at Step S95), the RTP/RTCP-based communication is terminated (Step S97). The callee processing is terminated, and the processing returns to the terminal processing (refer to FIG. 5).

In a case where the punch packets have not been received, even after a specified period of the time has elapsed since the completion notification packet was transmitted (NO at Step S87), an error notification is displayed on the display 861 in order to notify the user that a communication error has occurred. Error processing that is necessary in order to terminate the communication is performed (Step S91). The callee processing is terminated, and the processing returns to the terminal processing (refer to FIG. 5).

Through the procedures that are described above, it becomes possible for the RTP/RTCP-based communication to be performed between the terminal device 6 and the terminal device 7. In order for the RTP/RTCP-based communication to be performed, the destination port number for the RTP packet must be an even number, and the destination port number for the RTCP packet must be an odd number that is computed by adding 1 to the destination port number for the RTP packet. In order for the NAT devices 3 and 4 to forward the packets to the respectively subordinate terminal devices 6 and 7, it is necessary for the consecutive even and odd port numbers to be stored as the history information. The newest numbers in the history information port numbers that has been stored in the NAT devices 3 and 4 by the processing at Step S31 (refer to FIG. 6), Step S33 (refer to FIG. 6), Step S71 (refer to FIG. 8), and Step S73 (refer to FIG. 8), as explained previously, are odd numbers. Therefore, the consecutive even and odd port numbers are stored as the history information in the NAT devices 3 and 4 by the punch packets that are transmitted at Step S45 (refer to FIG. 7) and by the TTL modification packets that are transmitted at Step S83 (refer to FIG. 9). The terminal devices 6 and 7 can define the destination port numbers for the RTP packets and the RTCP packets as the port numbers that are stored as the history information in the NAT devices 3 and 4. This makes it possible for the terminal devices 6 and 7 to perform the RTP/RTCP-based communication.

Control processing will be explained with reference to FIG. 10. The control processing is started and performed by the CPU 21 when the power supply to the communication control device 2 is turned on. Before the control processing is performed, the communication control device 2 recognizes the IP addresses of the NAT devices 5. The port numbers that are necessary in order for the communication between the communication control device 2 and the terminal devices 8 to be performed have already been stored as the history information in the NAT devices 5. The communication control device 2 recognizes the port numbers that have been stored as the history information in the NAT devices 5. For each of the NAT devices 5, the communication control device 2 recognizes the NAT type (one of Full Cone NAT, Address-Restricted Cone NAT, Port-Restricted Cone NAT, and Symmetric NAT) and the port width. Accordingly, the processing that is necessary in order to start the communication with the terminal devices 8 has been omitted from the processing that is shown in FIG. 10.

As shown in FIG. 10, when the control processing is started, a determination is made as to whether the connection request packet has been received from the terminal device 6 (Step S101). In a case where the connection request packet has been received (YES at Step S101), the source IP address and the source port number for the connection request packet are acquired (Step S103). The acquired IP address corresponds to the IP address for the NAT device 3. The acquired port number corresponds to the newest port number that is stored as the history information in the NAT device 3. The information that is thus acquired is appended to the received connection request packet. The information on the NAT type and the port width for the NAT device 3 is also appended to the connection request packet. A new connection request packet is thus created (Step S105). The newly created connection request packet is transmitted to the terminal device 7 (Step S107). The processing returns to Step S101.

A determination is made as to whether the connection reply packet has been received from the terminal device 7 (NO at Step S101; Step S109). In a case where the connection reply packet has been received (YES at Step S109), the source IP address and the source port number for the connection request packet that was received at Step S101 are acquired (Step S111). The acquired IP address corresponds to the IP address for the NAT device 3. The acquired port number corresponds to the newest port number that is stored as the history information in the NAT device 3. The source IP address and the source port number for the received connection reply packet are acquired (Step S113). The acquired IP address corresponds to the IP address for the NAT device 4. The acquired port number corresponds to the newest port number that is stored as the history information in the NAT device 4.

The NAT information packet is created that contains the information that was acquired at Steps S111 and S113, as well as the NAT types and the port widths for the NAT devices 3 and 4 (Step S115). The created NAT information packet is transmitted to the terminal device 6 (Step S117). The NAT information packet is created that contains the information that was acquired at Step S113 (Step S119). The created NAT information packet is transmitted to the terminal device 7 (Step S121). The processing returns to Step S101.

A determination is made as to whether the completion notification packet has been received from the terminal device 7 (NO at Step S109; Step S123). In a case where the completion notification packet has been received (YES at Step S123), the destination IP address and the destination port number for the completion notification packet are acquired (Step S125). The completion notification packet is transmitted to the terminal device 6 based on the destination IP address and the destination port number that have been acquired (Step S127). The processing returns to Step S101.

determination is made as to whether another packet has been received from one of the terminal devices 6 and 7 (NO at Step S123; Step S129). In a case where another packet has been received (YES at Step S129), the received packet is discarded (Step S131). The processing returns to Step S101. In a case where no packet has been received (NO at Step S129), the processing returns to Step S101.

Figure 11:
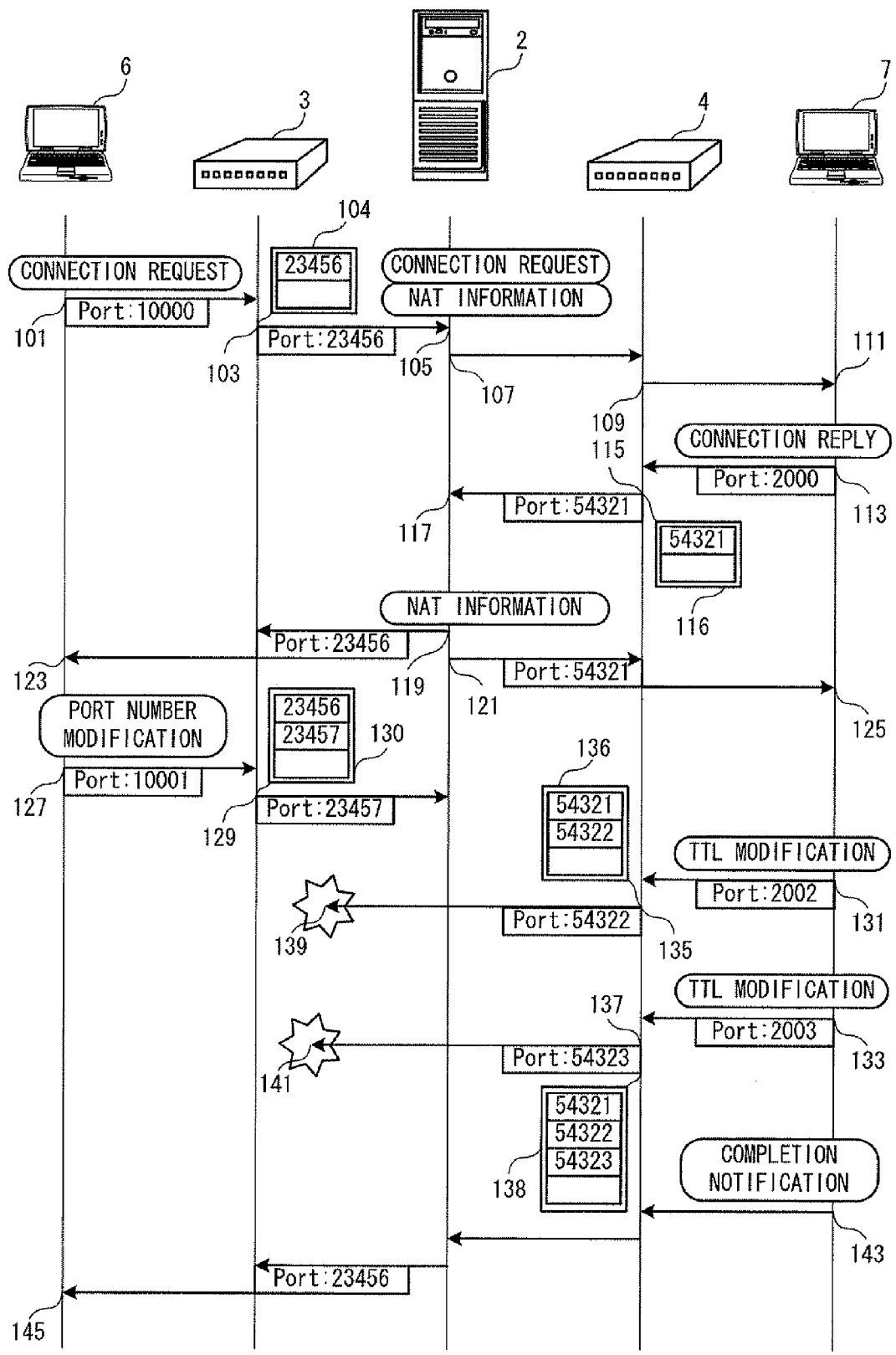
FIG. 11 is a communication sequence diagram that shows communication between a terminal device 6 and a terminal device 7.

The sequence of the communication that is performed through the communication control device 2, the NAT devices 3 and 4, and the terminal devices 6 and 7 will be explained with reference to FIGS. 11 and 12, as well as with reference to the flowcharts that have already been explained.

In a case where an operation to start the communication with the terminal device 7 has been performed through the keyboard 851 of the terminal device 6, the sockets are created in the terminal device 6 (Step S21; refer to FIG. 6). The port number 10000 is assigned to the first socket, which will be used for the communication with the communication control device 2, and the port number 10001 is assigned to the second socket, which will be used for the communication of the number modification packet.

The connection request packet is transmitted through the NAT device 3 to the terminal device 7 using the first socket (port number: 10000) (101; Step S25 (refer to FIG. 6)). In the NAT device 3, the connection request packet is forwarded to the communication control device 2 (103). In the NAT device 3, the source port number for the connection request packet is converted from 10000 to 23456. The converted port number 23456 is stored as the history information in the flash memory 57 of the NAT device 3 (104).

The communication control device 2 receives the connection request packet from the terminal device 6 (105; Step S101 (refer to FIG. 10)). Based on the received connection request packet, the IP address for the NAT device 3 and the port number 23456 are acquired (Step S103 (refer to FIG. 10)). The IP address and the port number that have been acquired, as well as the information on the NAT type and the port width for the NAT device 3, are appended to the connection request packet (Step S105 (refer to FIG. 10)). The connection request packet to which the information has been appended is transmitted to the terminal device 7 (107; Step S107 (refer to FIG. 10)). The transmitted connection request packet is forwarded by the NAT device 4 (109) and is received by the terminal device 7 (111; Step S15 (refer to FIG. 5)).

The sockets are created in the terminal device 7 (Step S61 (refer to FIG. 8)). The port number 2000 is assigned to the first socket, and the port number 2001 is assigned to the second socket. The connection reply packet is transmitted through the NAT device 4 to the communication control device 2 using the first socket (port number: 2000) (113; Step S65 (refer to FIG. 8)). In the NAT device 4, the connection reply packet is forwarded to the communication control device 2 (115). In the NAT device 4, the source port number for the connection reply packet is converted from 2000 to 54321. The converted port number 54321 is stored as the history information in the flash memory 57 of the NAT device 4 (116).

The connection reply packet is received by the communication control device 2 (117; Step S109 (refer to FIG. 10)). The NAT information packet is created that contains information on the IP addresses, the port numbers, the NAT types, and the port widths for the NAT devices 3 and 4 (Step S115 (refer to FIG. 10)). The created NAT information packet, with the destination port number set to the port number 23456, is transmitted through the NAT device 3 to the terminal device 6 (119; Step S117 (refer to FIG. 10)) and is received by the terminal device 6 (123; Step S27 (refer to FIG. 6)). The NAT information packet that contains information on the IP address, the port number, the NAT type, and the port width for the NAT device 4, with the destination port number set to the port number 54321, is transmitted through the NAT device 4 to the terminal device 7 (121; Step S121 (refer to FIG. 10)) and is received by the terminal device 7 (125; Step S67 (refer to FIG. 8)).

Based on the information on the port number for the NAT device 3 that is contained in the NAT information packet, the terminal device 6 determines whether or not to transmit the port number modification packet (Step S31 (refer to FIG. 6)).

At 104, the port number 23456 (an even number) was stored as the history information in the NAT device 3. In this case, the port number modification packet is transmitted using the second socket (port number: 10001) in order to cause the odd-numbered port number to be stored as the history information in the NAT device 3. The port number modification packet is transmitted through the NAT device 3 to the communication control device 2 (127; Step S33 (refer to FIG. 6)). The source port number for the port number modification packet that is received by the NAT device 3 is different from the source port number for the connection request packet that was received at 103. Therefore, the NAT device 3 converts the source port number for the port number modification packet from 10001 to 23457 by adding 1 to 23456 (129). The port number 23457 is stored as the history information in the NAT device 3 (130). The newest number in the history information that is stored in the NAT device 3 thus becomes an odd number.

In the same manner, the terminal device 7, based on the information on the port number for the NAT device 4 that is contained in the NAT information packet, determines whether or not to transmit the port number modification packet (Step S71 (refer to FIG. 8)). At 116, the newest port number 54321 (an odd number) was stored as the history information in the NAT device 4. In this case, the port number modification packet is not transmitted.

The terminal device 6 closes the second socket. The third socket and the fourth socket are newly created, and the port numbers are assigned to the third socket and the fourth socket that have been created (Step S35 (refer to FIG. 6)). The assigned port numbers are consecutive values that start with an even number. 10002 is assigned to the third socket. 10003 is assigned to the fourth socket.

The terminal device 7 closes the second socket. The third socket and the fourth socket are newly created, and the port numbers are assigned to the third socket and the fourth socket that have been created (Step S75 (refer to FIG. 8)). The assigned port numbers are consecutive values that start with an even number. 2002 is assigned to the third socket. 2003 is assigned to the fourth socket.

The terminal device 7 specifies the destination port numbers for the RTP packet and the RTCP packet (Steps S77 to S81 (refer to FIG. 9)). At 104, the newest port number 23456 (an even number) was stored as the history information in the NAT device 3. Therefore, the terminal device 7 sets the destination port number for the RTP packet to 23458 by adding 2 to the port number 23456 (Step S79 (refer to FIG. 9)), then sets the destination port number for the RTCP packet to 23459 by adding 1 to 23458.

The first TTL modification packet is transmitted using the third socket (port number: 2002) (131; Step S83 (refer to FIG. 9)). The destination port number for the first TTL modification packet is the destination port number 23458 that was specified for the RTP packet. The (second) TTL modification packet is transmitted using the fourth socket (port number: 2003) (133; Step S83 (refer to FIG. 9)). The destination port number for the second TTL modification packet is the destination port number 23459 that was specified for the RTCP packet.

The two TTL modification packets are forwarded by the NAT device 4 (135, 137). The NAT device 4 converts the source port number for the first TTL modification packet to 54322 by adding 1 to the newest port number 54321 that are stored as the history information (refer to 115) (135). The converted port number 54322 is stored as the history information (136). The NAT device 4 converts the source port number for the second TTL modification packet to 54323 by adding 1 to the port number 54322 (137). The converted port number 54323 is stored as the history information (138). Both of the packets are discarded before arriving at the terminal device 6 because the TTLs become zero (139, 141).

When the TTL modification packets are transmitted from the terminal device 7, 23458 and 23459 have not been stored as the history information in the NAT device 3. Therefore, even if the TTL modification packets arrive at the NAT device 3, the NAT device 3 does not forward the TTL modification packets to the terminal device 6. In the present embodiment, the TTLs for the TTL modification packets are set to low values, so the TTL modification packets are discarded before they reach the NAT device 3.

The completion notification packet is transmitted from the terminal device 7, through the NAT devices 3 and 4 and the communication control device 2, to the terminal device 6 (143; Step S85 (refer to FIG. 9)). The communication control device 2 converts the destination port number for the completion notification packet such that the source port number 23456 for the connection request packet that was received from the terminal device 6 at 105 becomes the destination port number. The communication control device 2 forwards the completion notification packet, and the completion notification packet is received by the terminal device 6 (145; Step S37 (refer to FIG. 6)).

The terminal device 6 specifies the destination port numbers for the RTP packet and the RTCP packet (Steps S39 to S43 (refer to FIG. 7)). The port number 54321 (an odd number) has been stored in the NAT device 4 (116). Therefore, the terminal device 6 sets the destination port number for the RTP packet to 54322 by adding 1 to the port number 54321 (Step S43 (refer to FIG. 7)), and sets the destination port number for the RTCP packet to 54323 by adding 1 to 54322. These port numbers match the port numbers 54322 and 54323 that were stored in the NAT device 4 by the TTL modification packets that were transmitted from the terminal device 7 (136, 138).

Figure 12:
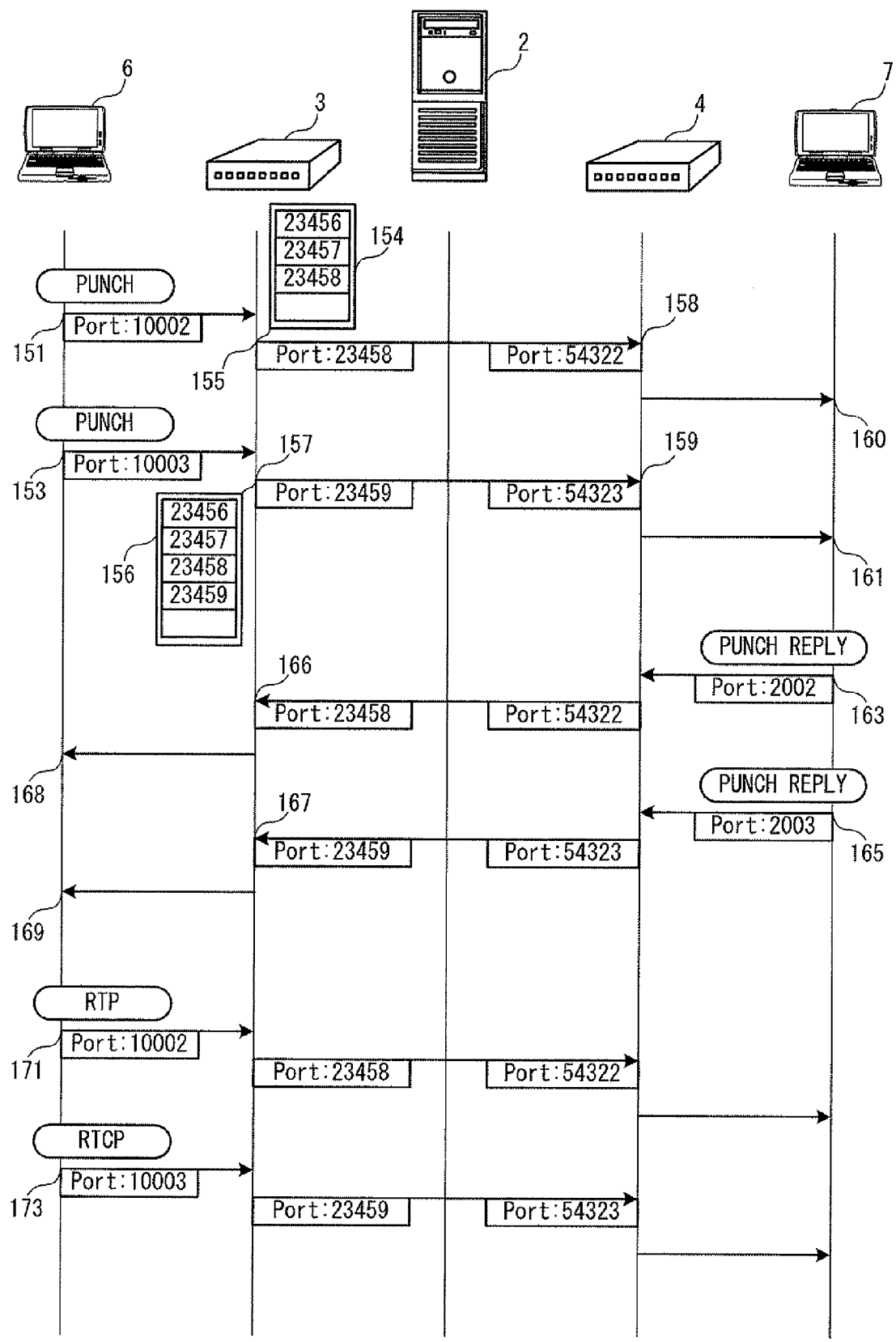
FIG. 12 is a communication sequence diagram that shows the communication between the terminal device 6 and the terminal device 7, continued from FIG. 11.

As shown in FIG. 12, the first punch packet is transmitted using the third socket (151; Step S45 (refer to FIG. 7)). The destination port number for the first punch packet (54322) has been specified for the RTP packet. The second punch packet is transmitted using the fourth socket (153; Step S45 (refer to FIG. 7)). The destination port number for the second punch packet 54323 that was specified for the RTCP packet.

The first and second punch packets pass through the NAT device 3 (155, 157). The NAT device 3 converts the source port number for the first punch packet to 23458 by adding 1 to the newest port number 23457 (130 (refer to FIG. 11)) that are stored as the history information (155). The converted port number 23458 is stored as the history information (154). The NAT device 3 converts the source port number for the second punch packet to 23459 by adding 1 to the 23458 that was defined as the source port number for the first punch packet (157). The converted port number 23459 is stored as the history information (156). These port numbers match the destination port number 23458 for the RTP packet and the destination port number 23459 for the RTCP packet that were specified by the terminal device 7 (Steps S77 to S81 (refer to FIG. 9)).

The two punch packets are respectively transmitted to the port numbers 54322 and 54323 that have been stored as the history information in the NAT device 4. The NAT device 4 forwards the punch packets to the terminal device 7 (158, 159).

The terminal device 7 receives the punch packets (160, 161; Step S87 (refer to FIG. 9)). The terminal device 7 transmits the punch reply packets for the respective punch packets (163, 165; Step S89 (refer to FIG. 9)). The destination port numbers for the punch reply packets are respectively the destination port number (23458) for the RTP packet and the destination port number (23459) for the RTCP packet that were specified at Steps S77 to S81 (refer to FIG. 9). These port numbers match the port numbers 23458 and 23459 that were stored as the history information when the NAT device 3 forwarded the punch packets. Therefore, the NAT device 3 forwards the punch reply packets to the terminal device 6 (166, 167). The terminal device 6 receives the punch reply packets (168, 169; Step S47 (refer to FIG. 7)).

The terminal device 6 transmits the RTP packet and the RTCP packet based on the destination port number 54322 that was specified for the RTP packet and the destination port number 54323 that was specified for the RTCP packet (171, 173). The terminal device 7 transmits the RTP packet and the RTCP packet based on the destination port number 23458 that was specified for the RTP packet and the destination port number 23459 that was specified for the RTCP packet, although this is not shown in the drawings. These destination port numbers match the port numbers that have been stored as the history information in the NAT devices 3 and 4, respectively. Therefore, the NAT devices 3 and 4 forward the RTP packets and the RTCP packets that they receive to the terminal devices 6 and 7, respectively. Note that the conditions that the destination port number for the RTP packet be an even number and that the destination port number for the RTCP packet be an odd number that is computed by adding 1 to the destination port number for the RTP packet have been fulfilled. The terminal devices 6 and 7 are therefore able to perform the RTP/RTCP-based communication.

As explained previously, in the present embodiment, the consecutive even and odd port numbers are stored as the history information in the NAT devices 5. Therefore, using the stored port numbers as the destination port numbers for the RTP packet and the RTCP packet, respectively, makes it possible for any two of the terminal devices 8 to perform the RTP/RTCP-based communication.

By modifying the port numbers that are assigned to the sockets, the terminal device 6 is able to make the source port numbers for the connection request packet, the port number modification packet, and the punch packets different from one another. In the same manner, the terminal device 7 is able to make the source port numbers for the punch reply packets, the port number modification packet, and the TTL modification packets different from one another. The port numbers that are assigned to the packets are thus updated in increments of 1, even in a case where the NAT type for the NAT devices 3 and 4 is a Cone NAT, so the RTP/RTCP-based communication can be performed.

In a case where the port width for the NAT devices 5 is 1, the terminal devices 8 transmit the packets. The terminal devices 8 are thus able to confirm that the port width for the NAT devices 5 is 1 and to transmit the packets.

The present invention is not limited to the embodiment that is described above, and various modifications are possible. In the embodiment that is described above, the terminal device 8 determines whether or not to transmit the port number modification packet, the punch packets, and the TTL modification packets based on the port width that is contained in the NAT information packet. The terminal device 8 may receive information on the port width from the communication control device 2 before the connection request packet is transmitted. In a case where the port width is not 1, the terminal device 8 may not transmit the connection request packet. The terminal device 8 may also receive the information on the port width from the communication control device 2 in a case where the terminal device 8 has received the connection request packet.

In a case where the port width is not 1, the terminal device 8 may not transmit the connection reply packet.

In the embodiment that is described above, a case was assumed in which there are the two terminal devices (the terminal devices 6 and 7). The present invention is not limited to this configuration. There may also be three or more of the terminal devices that perform the RTP/RTCP-based communication. A modified example of the embodiment that is described above will be explained.

Figure 13:
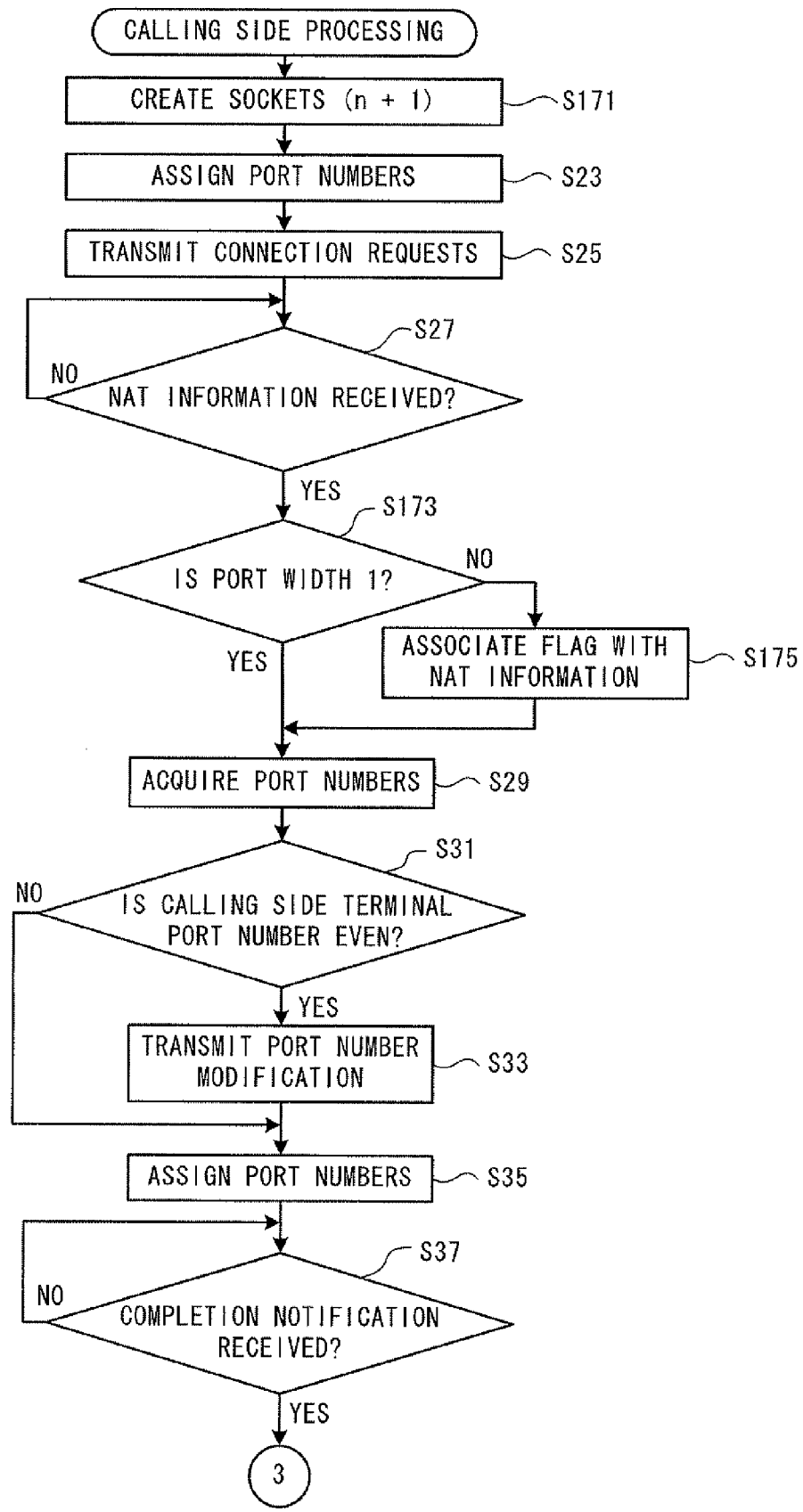
FIG. 13 is a flowchart that shows caller processing in a modified example.
Figure 14:
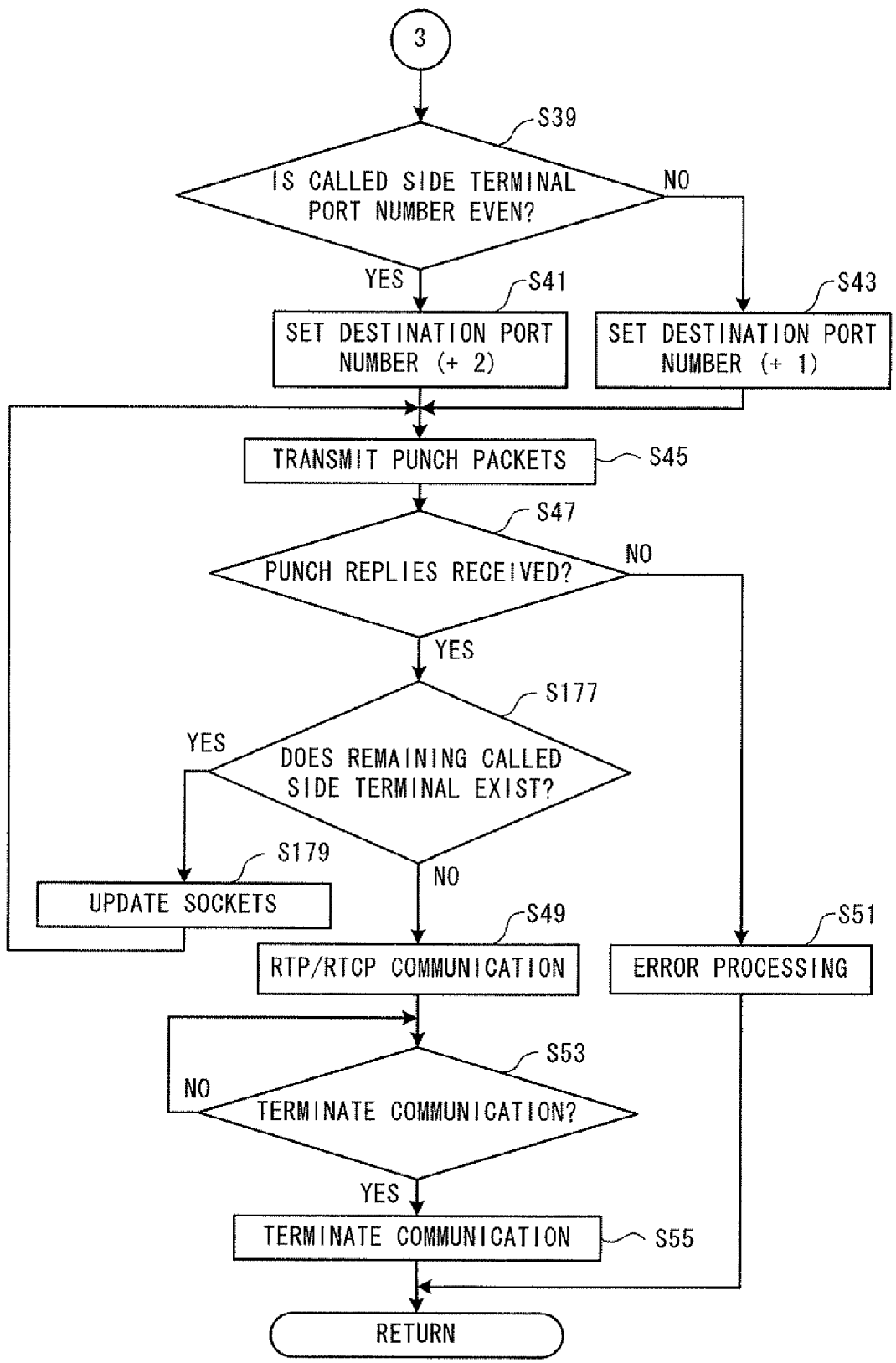
FIG. 14 is a flowchart that shows the caller processing in the modified example, continued from FIG. 13.

In the modified example, the caller processing in FIGS. 13 and 14, the RTP/RTCP-based communication is performed in relation to a number n of the terminal devices 8 (n being an integer that is not less than 1). The other processing (the terminal processing, the callee processing, the control processing) is the same as in the embodiment that is described above.

As shown in FIG. 13, in the caller processing in the modified example, sockets are created (Step S171). The number of the sockets that are created is n+1. One of the sockets (called a X1 socket) is for performing the communication with the communication control device 2, and the sockets (called a X2, a X3, and the like) for performing the communication of the port number modification packets are n in number. The port numbers are assigned to the created sockets (Step S23). The assigned port numbers are consecutive values that start with an even number.

The X1 socket is used. The connection request packets for the n callee terminals are transmitted to the communication control device 2 (Step S25). The NAT device 3, when forwarding the connection request packets, converts the source port number for the connection request packets. The converted source port number is stored as the port number history information.

The communication control device 2 forwards the received connection request packets to the n callee terminals. The connection reply packets are transmitted from the respective callee terminals (Step S65; refer to FIG. 8), and the communication control device 2 receives the connection reply packets (Step S109; refer to FIG. 10). The communication control device 2 creates the NAT information packet based on the connection reply packets that are received from the callee terminals and transmits the NAT information packet to the caller terminal (Step S117; refer to FIG. 10). The IP addresses, the port numbers, the NAT types, and the port widths for the NAT devices 5 that are respectively connected directly to the n callee terminals are contained in the NAT information packet.

A determination is made as to whether the NAT information packet that was transmitted from the communication control device 2 has been received through the NAT device 3 (Step S27). In a case where the NAT information packet has been received through the NAT device 3 (YES at Step S27), the NAT information is stored in the RAM 83. A determination is made as to whether or not the port widths for the NAT devices 5 that are included in the NAT information are all 1 (Step S173). In a case where the port width for at least one of the NAT devices 5 is not 1 (NO at Step S173), the caller terminal cannot perform the RTP/RTCP-based communication with the corresponding callee terminal. Flag information (a disabled flag) is associated with the NAT information for the NAT device 5 in question (Step S175). The processing advances to Step S29. In a case where the port widths for all of the NAT devices 5 are 1 (YES at Step S173), the processing advances to Step S29.

In the processing at Step S29, the port numbers for the NAT devices 5 to which the calling side terminal is directly connected are acquired (Step S29). A determination is made as to whether the port number for the NAT device 5 to which the caller terminal is directly connected is an even number (Step S31). In a case where the port number is an even number (YES at Step S31), the port number modification packet is transmitted to the communication control device 2 using the X2 socket (Step S33). The processing advances to Step S35. In a case where the acquired port number is an odd number (NO at Step S31), the processing advances to Step S35.

The socket that was created at Step S171 for communicating the port number modification packet is closed. New sockets are created. The number of the sockets that are created is 2n. These sockets (called a Y1, a Y2, and the like) are used for the RTP/RTCP-based communication with the corresponding callee terminals. The port numbers are assigned to the newly created sockets (Step S35). The assigned port numbers are consecutive values that start with an even number.

A determination is made as to whether the completion notification packet that was transmitted from all of the callee terminals has been received (Step S37). In a case where the completion notification packet has been received (YES at Step S37), the processing advances to Step S39 (refer to FIG. 14).

In the processing at Steps S39 to S43 in FIG. 14, the destination port numbers that will be used when the RTP packets and the RTCP packets are transmitted are specified based on the port numbers that are stored in the NAT devices 5 that are directly connected to the respective callee terminals. The destination port number for each of the RTP packets is made an even number. The destination port number for each of the RTCP packets is made an odd number that is computed by adding 1 to the destination port number for the corresponding RTP packet. The destination port numbers for the RTP packets and the RTCP packets are specified for each of the plurality of the NAT devices 5. The processing advances to Step S45.

Processing is performed that stores the port numbers in the respective NAT devices 5 such that the RTP packets and the RTCP packets that are transmitted from the n callee terminals can be received. The Y1 socket and the like that were created at Step S35 (refer to FIG. 13) are used. The first punch packet and the second punch packet are transmitted to one of the callee terminals using the Y1 socket and the Y2 socket. The destination port numbers for the punch packets are defined as the destination port number that was specified for the RTP packet and the destination port number that was specified for the RTCP packet (Step S45).

The two punch packets are transmitted to one of the callee terminals by way of the NAT device 5. When forwarding the two punch packets, the NAT device 5 stores both of the assigned port numbers as the history information in the flash memory 57.

After the punch packets are transmitted, a determination is made as to whether the punch reply packets that are transmitted from the callee terminal have been received (Step S47). In a case where the punch reply packets have been received (YES at Step S47), a determination is made as to whether another of the callee terminals exists to which the punch packets have not yet been transmitted (Step S177). In a case where another of the callee terminals does exist (YES at Step S177), the Y3 socket and the Y4 socket are selected (Step S179), and the processing returns to Step S45. The first punch packet and the second punch packets are transmitted to the callee terminal to which the punch packets have not yet been transmitted. As described above, the sockets are selected as needed, and the (first and second) punch packets are transmitted to all of the callee terminals that is directly connected with the NAT devices 5 with which the communication disabled flag has not been associated. In a case where the punch packets have been transmitted to all of the callee terminals that are respectively connected with the NAT device 5 with which the disabled flag has not been associated (NO at Step S177), the RTP/RTCP-based communication is performed between the caller terminal and the callee terminals (Step S49).

In a case where the punch reply packets have not been received, even after a specified period of the time has elapsed since the punch packets were transmitted (NO at Step S47), a communication error occurs, so the communication with the callee terminals cannot continue to be performed. In that case, an error notification is displayed on the display 861 in order to notify the user that the communication error has occurred. Error processing that is necessary in order to terminate the communication is performed (Step S51). The caller processing is terminated, and the processing returns to the terminal processing (refer to FIG. 5).

As has been explained above, the caller terminal is capable of performing the RTP/RTCP-based communication with the n callee terminals. The port numbers (for the communication of the RTP packets and the communication of the RTCP packets) for communicating with the individual callee terminals are stored as the history information in the NAT device 5 that is directly connected to the caller terminal. The callee terminals transmit the RTP packets and the RTCP packets to the port numbers that are stored in the corresponding NAT devices 5. The port numbers for the communication of the RTP packets are even numbers. The port numbers for the communication of the RTCP packets are odd numbers that are computed by adding 1 to the port numbers for the communication of the corresponding RTP packets. Therefore, the RTP packets and the RTCP packets that are transmitted from the callee terminals pass through the NAT devices 5 and arrive at the caller terminal.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A communication system for performing communication based on Real-time Transport Protocol/RTP Control Protocol (RTP/RTCP) comprising:
  a communication control device configured to be connected to an external network;
  a caller terminal device configured to be connected to an internal network that is subordinate to a first NAT device, the first NAT device configured to be connected to the external network and provided with a NAT function; and
  a callee terminal device configured to be connected to another internal network that is subordinate to a second NAT device, the second NAT device configured to be connected to the external network and provided with the NAT function,
  wherein
  the caller terminal device includes:
    a first transmission unit that transmits a first packet through the first NAT device to the communication control device;

a first receiving unit that receives from the communication control device a second packet that contains a first port number and a second port number, the first port number being stored in the first NAT device in a case where the first NAT device received the first packet that was transmitted by the caller terminal device, the second port number being stored in the second NAT device in a case where the second NAT device received a third packet that was transmitted by the callee terminal device;

a first determination unit that determines whether the second port number that is contained in the second packet that was received by the first receiving unit is one of an odd number and an even number; and a second transmission unit that transmits, in a case where it has been determined that the second port number is an odd number, an RTP packet to a port number that is computed by adding 2n−1 (n being an integer that is not less than 1) to the second port number, then transmits an RTCP packet to a port number that is computed by adding 2n to the second port number, and transmits in a case where it has been determined that the second port number is an even number, the RTP packet to a port number that is computed by adding 2n to the second port number, then transmits the RTCP packet to a port number that is computed by adding 2n−1 to the second port number, the callee terminal device includes:

a second receiving unit that receives the first packet transmitted from the communication control device; and a third transmission unit that transmits the third packet through the second NAT device to the communication control device, the communication control device includes:

a third receiving unit that receives the first packet that is transmitted from the caller terminal device;

a fourth transmission unit that transmits the received first packet to the callee terminal device;

a fourth receiving unit that receives the third packet that is transmitted from the callee terminal device; and a fifth transmission unit that transmits the second packet containing the first port number and the second port number to the caller terminal device.

2. The communication system for performing communication based on Real-time Transport Protocol/RTP Control Protocol (RTP/RTCP) according to claim 1, wherein the caller terminal device further comprises:

a second determination unit that determines whether the first port number contained in the received second packet is one of an odd number and an even number; and a sixth transmission unit that transmits, in a case where it has been determined that the first port number is an even number, a fourth packet for updating the first port number that is stored in the first NAT device.

3. The communication system for performing communication based on Real-time Transport Protocol/RTP Control Protocol (RTP/RTCP) according to claim 2, wherein the caller terminal device transmits, by the sixth transmission unit, the fourth packet using a port number that is different from a port number that is used when transmitting the first packet.

4. The communication system for performing communication based on Real-time Transport Protocol/RTP Control Protocol (RTP/RTCP) according to claim 1, wherein:

the callee terminal device includes at least two callee terminal devices;

the communication control device transmits, by the fourth transmission unit, the first packet to each of the at least two callee terminal devices;

each of the at least two callee terminal devices transmit, by the third transmission unit, the third packet to the communication control device;

the communication control device transmits, by the fifth transmission unit, second packets containing the second port number that correspond to the at least two callee terminal devices to the caller terminal device;

the caller terminal device receives, by the first receiving unit, the second packets;

the caller terminal device determines, by the first determination unit, whether each of the second port numbers that are contained in the received second packets is one of an odd number and an even number; and the caller terminal device determines port numbers for a destination of the RTP packet and a destination of the RTCP packet for each of the at least two callee terminal devices, based on the second port number that is contained in the corresponding received second packet, and transmits, by the second transmission unit, the RTP packet and the RTCP packet to the respective port numbers that have been determined.

5. The communication system for performing communication based on Real-time Transport Protocol/RTP Control Protocol (RTP/RTCP) according to claim 1, wherein the caller terminal device further comprises:

a third determination unit that determines, whether the first port number is incremented by 1 by the first NAT device, in a case where the first NAT device has received a packet that is directed toward the external network side from a subordinate network side of the first NAT device, wherein the caller terminal device transmits, by the second transmission unit, at least one of the RTP packet, and the RTCP packet in a case where a determination is made by the third determination unit that the first port number is incremented by 1 by the first NAT device.

6. A terminal device for performing communication based on Real-time Transport Protocol/RTP Control Protocol (RTP/RTCP), that is configured to be connected to an internal network that is subordinate to a NAT device that is configured to be connected to an external network and provided with a NAT function, comprising:

a first transmission unit that transmits a first packet through the NAT device to a communication control device connected to the external network;

a first receiving unit that receives from the communication control device a second packet that contains a first port number and a second port number, the first port number being stored in the NAT device in a case where the NAT device receives the first packet that was transmitted by the terminal device, the second port number being stored in another NAT device in a case where the other NAT device receives a third packet from another terminal device, the other NAT device being connected to the external network and provided with the NAT function, the other terminal device being connected to another internal network that is subordinate to the other NAT device and being adapted to transmit the third packet to the communication control device when the other terminal device receives the first packet transmitted from the communication control device;

a first determination unit that determines whether the second port number that is contained in the second packet that was received by the first receiving unit is one of an odd number and an even number; and a second transmission unit that transmits, in a case where it has been determined that the second port number is an odd number, an RTP packet to a port number that is computed by adding 2n−1 (n being an integer that is not less than 1) to the second port number, then transmits an RTCP packet to a port number that is computed by adding 2n to the second port number, and transmits, in a case where it has been determined that the second port number is an even number, the RTP packet to a port number that is computed by adding 2n to the second port number, then transmits the RTCP packet to a port number that is computed by adding 2n+1 to the second port number.

7. A communication method for performing communication based on Real-time Transport Protocol/RTP Control Protocol (RTP/RTCP) between terminal devices that are respectively configured to be connected to different internal networks that are subordinate to different NAT devices that are each configured to be connected to an external network and provided with a NAT function, the communication method comprising the steps of:

transmitting a first packet, from a terminal device, through a NAT device to a communication control device connected to the external network;

transmitting a third packet, from another terminal device when the other terminal device receives the first packet transmitted from the communication control device, through another NAT device to the communication control device, the other terminal device being connected to the internal network that is subordinate to the other NAT device;

transmitting a second packet, from the communication control device to the terminal device, the second packet containing a first port number and a second port number that are respectively stored in the NAT device that forwarded the first packet and in the other NAT device that forwarded the second packet;

receiving, by the terminal device, the second packet that was transmitted from the communication control device;

determining, by the terminal device, whether the second port number contained in the received second packet is one of an odd number and an even number;

transmitting, from the terminal device, in a case where it has been determined that the second port number is an odd number, an RTP packet to a port number that is computed by adding 2n−1 (n being an integer that is not less than 1) to the second port number, then transmitting an RTCP packet to a port number that is computed by adding 2n to the second port number, and transmitting, from the terminal device, in a case where it has been determined that the second port number is an even number, the RTP packet to a port number that is computed by adding 2n to the second port number, then transmitting the RTCP packet to a port number that is computed by adding 2n+1 to the second port number.

* * * * *